United States Patent
Myung et al.

(10) Patent No.: US 12,495,444 B2
(45) Date of Patent: Dec. 9, 2025

(54) METHOD FOR PERFORMING CHANNEL ACCESS PROCEDURE AND APPARATUS THEREFOR

(71) Applicant: LG Electronics Inc., Seoul (KR)

(72) Inventors: Sechang Myung, Seoul (KR); Suckchel Yang, Seoul (KR); Seonwook Kim, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 394 days.

(21) Appl. No.: 18/005,147

(22) PCT Filed: Jul. 28, 2021

(86) PCT No.: PCT/KR2021/009786
§ 371 (c)(1),
(2) Date: Jan. 11, 2023

(87) PCT Pub. No.: WO2022/030864
PCT Pub. Date: Feb. 10, 2022

(65) Prior Publication Data
US 2023/0262757 A1    Aug. 17, 2023

(30) Foreign Application Priority Data

Aug. 5, 2020 (KR) ............... 10-2020-0098175

(51) Int. Cl.
*H04W 74/08* (2024.01)
*H04W 74/0808* (2024.01)

(52) U.S. Cl.
CPC .............. *H04W 74/0808* (2013.01)

(58) Field of Classification Search
CPC .............. H04W 16/28; H04W 74/0808
See application file for complete search history.

(56) References Cited

U.S. PATENT DOCUMENTS

| | | | |
|---|---|---|---|
| 2021/0185719 A1* | 6/2021 | Xue | H04L 5/0092 |
| 2021/0307063 A1* | 9/2021 | Yerramalli | H04W 72/046 |
| 2022/0039163 A1* | 2/2022 | Park | H04L 5/0091 |
| 2023/0009559 A1* | 1/2023 | Wang | H04B 7/0695 |

* cited by examiner

*Primary Examiner* — Derrick V Rose
(74) *Attorney, Agent, or Firm* — Fish & Richardson P.C.

(57) ABSTRACT

The present disclosure provides a method for transmitting an uplink signal by a terminal in a wireless communication system. In particular, the method may comprise: performing a first listen-before-talk (LBT) on the basis of a specific beam; on the basis of the failure of the first LBT, performing a second LBT on the basis of a beam group including the specific beam; and transmitting the uplink signal on the basis of the success of the second LBT, wherein a first energy detection (ED) threshold value for the first LBT is less than or equal to a second ED threshold value for the second LBT.

10 Claims, 26 Drawing Sheets

(a) Uplink Tx procedure based on dynamic grant (b) Uplink Tx procedure based on configured grant FIG. 7
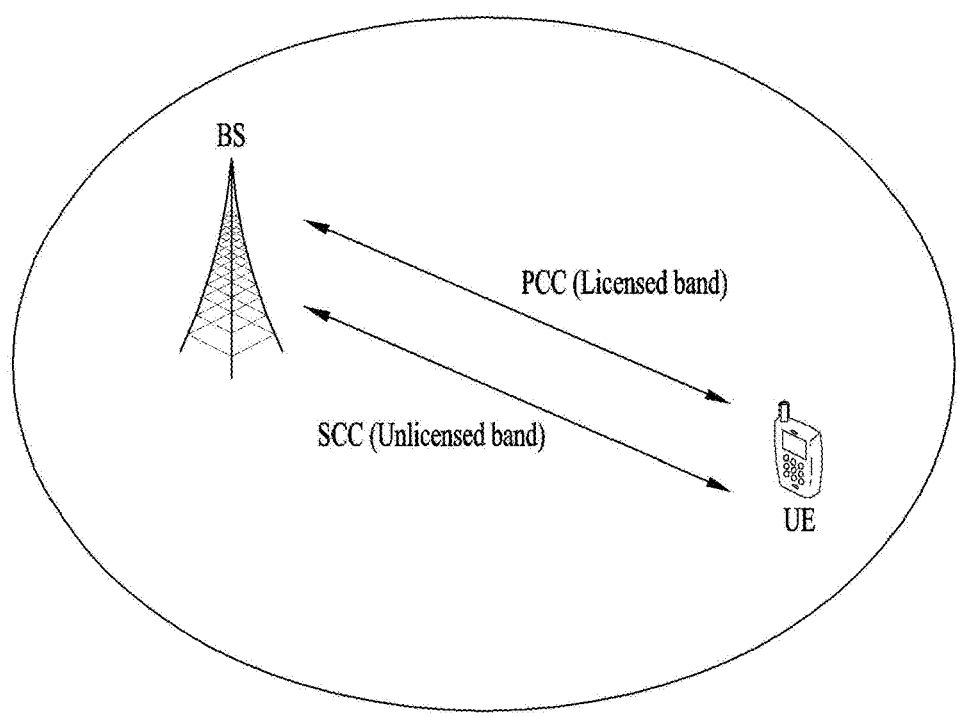
(a) Carrier aggregation between L-band and U-band
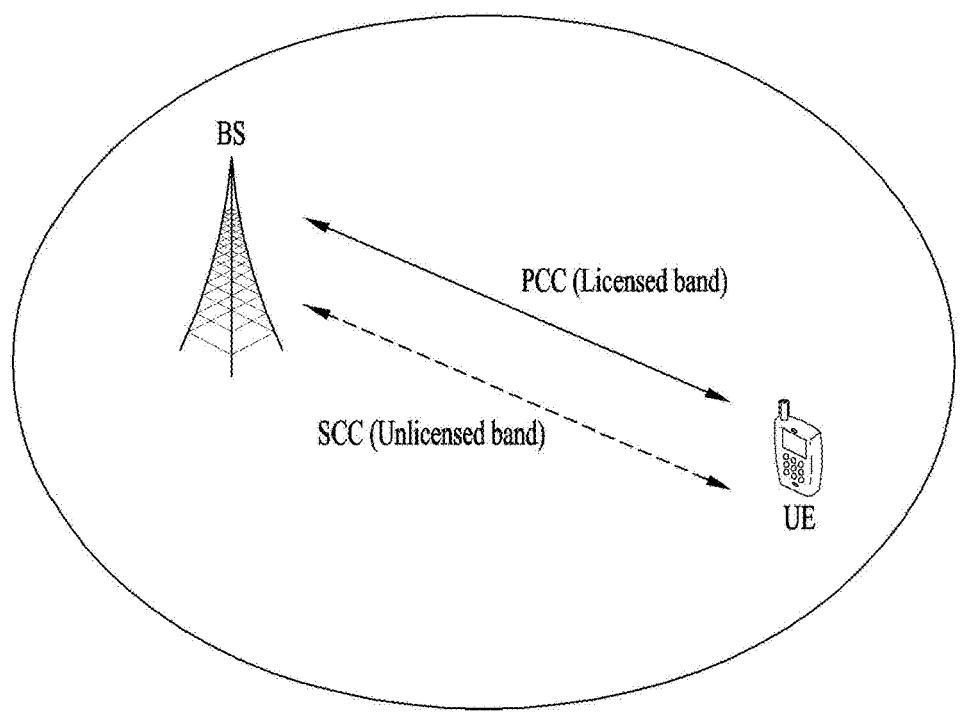
(b) Standalone U-band(s)

FIG. 12
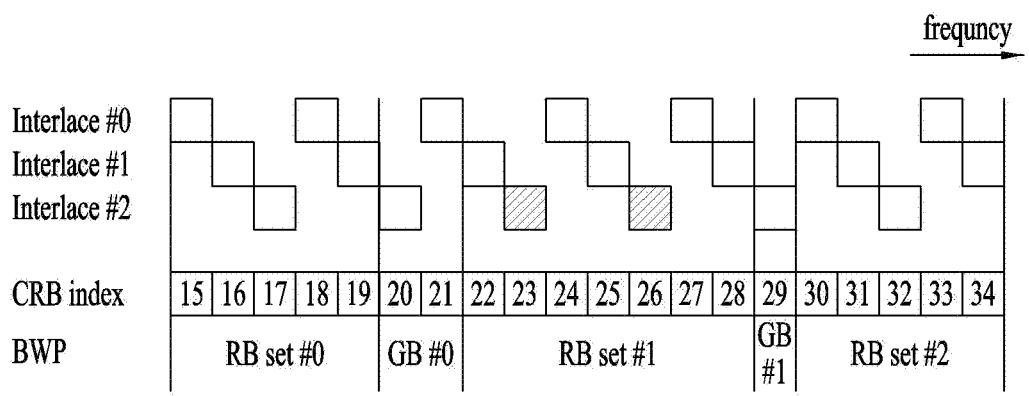
RB assignment information for PUSCH: {Interlace #2, RB set #1} => Intersection of Interlace # and RB set #1
(a) Case 1: one SB index is indicated via RA information for PUSCH
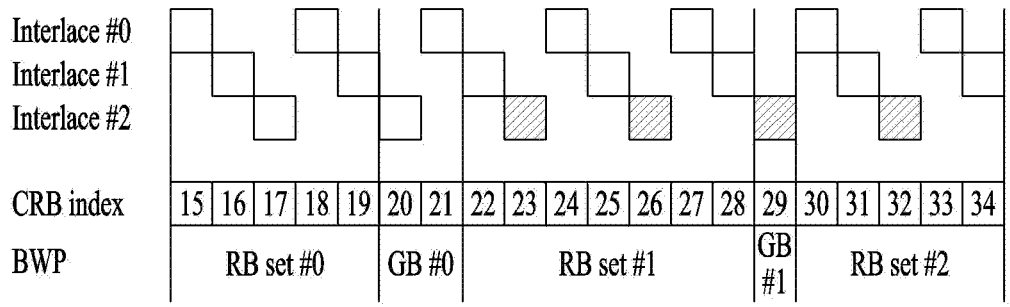
RB assignment information for PUSCH: {Interlace #2, RB sets #1/#2} =>
=> Intersection of Interlace # and RB set #1/GB #2/RB set #1
(a) Case 2: consecutive SB index is indicated via RA information for PUSCH FIG. 16
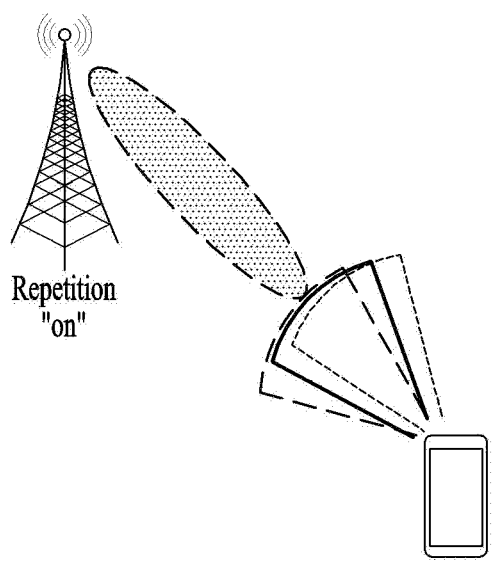
(a)
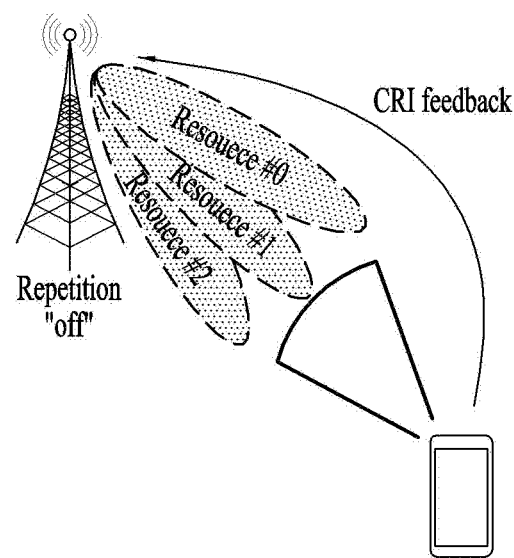
(b)

FIG. 17
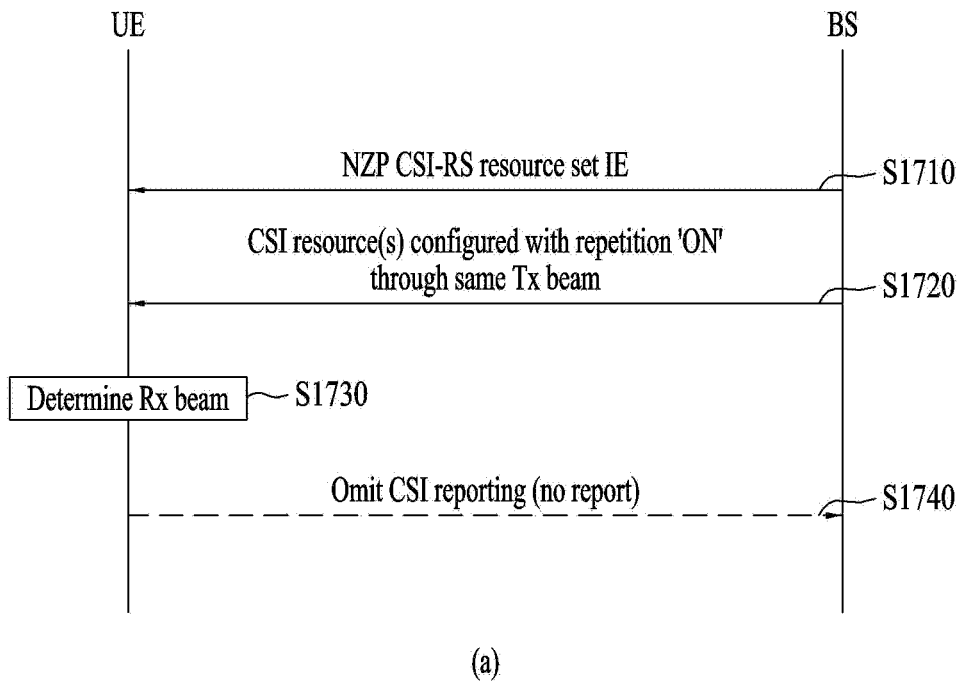
(a)
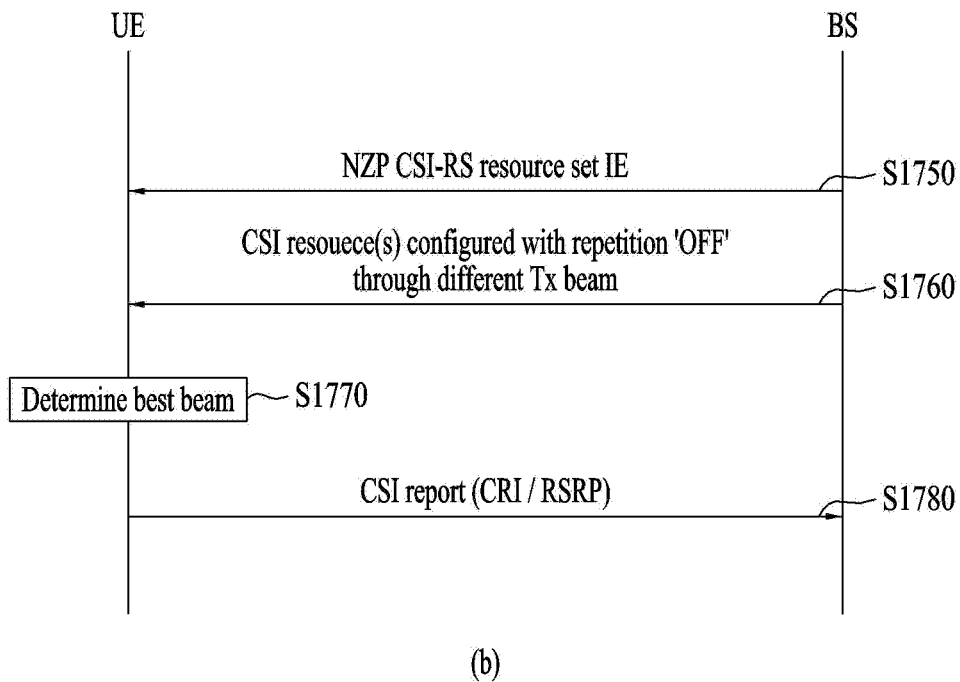
(b)

METHOD FOR PERFORMING CHANNEL ACCESS PROCEDURE AND APPARATUS THEREFOR

CROSS-REFERENCE TO RELATED APPLICATIONS

This application is a National Stage application under 35 U.S.C. § 371 of International Application No. PCT/KR2021/009786, filed on Jul. 28, 2021, which claims the benefit of Korean Application No. 10-2020-0098175, filed on Aug. 5, 2020. The disclosures of the prior applications are incorporated by reference in their entirety.

TECHNICAL FIELD

The present disclosure relates to a method of performing a channel access procedure and apparatus therefor, and more particularly, to a method of performing listen-before-talk (LBT) based on beams or LBT based on beam groups and apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method of performing a channel access procedure and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, there is provided a method of transmitting an uplink signal by a user equipment (UE) in a wireless communication system. The method may include: performing first listen-before-talk (LBT) based on a specific beam; based on failure of the first LBT, performing second LBT based on a beam group including the specific beam; and based on success of the second LBT, transmitting the uplink signal. A first energy detection (ED) threshold for the first LBT may be smaller than or equal to a second ED threshold for the second LBT.

In this case, at least one of a first contention window size (CWS) or a first backoff counter value for the first LBT may depend on at least one of a second CWS and a second backoff counter value for the second LBT.

In addition, a first CWS and a first backoff counter value for the first LBT and a second CWS and a second backoff counter value for the second LBT may be obtained independently.

The second LBT based on the beam group may be omnidirectional LBT related to omnidirectional beams.

Each of the first LBT and the second LBT may be LBT based on a backoff counter.

In another aspect of the present disclosure, there is provided a UE configured to transmit an uplink signal in a wireless communication system. The UE may include: at least one transceiver; at least one processor; and at least one memory operably connected to the at least one processor and configured to store instructions that, when executed, cause the at least one processor to perform operations. The operations may include: performing first LBT based on a specific beam; based on failure of the first LBT, performing second LBT based on a beam group including the specific beam; and based on success of the second LBT, transmitting the uplink signal through the at least one transceiver. A first ED threshold for the first LBT may be smaller than or equal to a second ED threshold for the second LBT.

In this case, at least one of a first CWS or a first backoff counter value for the first LBT may depend on at least one of a second CWS and a second backoff counter value for the second LBT.

In addition, a first CWS and a first backoff counter value for the first LBT and a second CWS and a second backoff counter value for the second LBT may be obtained independently.

The second LBT based on the beam group may be omnidirectional LBT related to omnidirectional beams.

Each of the first LBT and the second LBT may be LBT based on a backoff counter.

In another aspect of the present disclosure, there is provided an apparatus configured to transmit an uplink signal in a wireless communication system. The apparatus may include: at least one processor; and at least one memory operably connected to the at least one processor and configured to store instructions that, when executed, cause the at least one processor to perform operations. The operations may include: performing first LBT based on a specific beam; based on failure of the first LBT, performing second LBT based on a beam group including the specific beam; and based on success of the second LBT, transmitting the uplink signal. A first ED threshold for the first LBT may be smaller than or equal to a second ED threshold for the second LBT.

In another aspect of the present disclosure, there is provided a computer-readable storage medium comprising at least one computer program that causes at least one processor to perform operations. The operations may include: performing first LBT based on a specific beam; based on failure of the first LBT, performing second LBT based on a beam group including the specific beam; and based on success of the second LBT, transmitting the uplink signal. A first ED threshold for the first LBT may be smaller than or equal to a second ED threshold for the second LBT.

In another aspect of the present disclosure, there is provided a method of transmitting a downlink signal by a base station in a wireless communication system. The method may include: performing first LBT based on a specific beam; based on failure of the first LBT, performing second LBT based on a beam group including the specific beam; and based on success of the second LBT, transmitting the downlink signal. A first ED threshold for the first LBT may be smaller than or equal to a second ED threshold for the second LBT.

In a further aspect of the present disclosure, there is provided a base station configured to transmit a downlink signal in a wireless communication system. The base station may include: at least one transceiver; at least one processor; and at least one memory operably connected to the at least one processor and configured to store instructions that, when executed, cause the at least one processor to perform operations. The operations may include: performing first LBT based on a specific beam; based on failure of the first LBT, performing second LBT based on a beam group including the specific beam; and based on success of the second LBT, transmitting the downlink signal through the at least one transceiver. A first ED threshold for the first LBT may be smaller than or equal to a second ED threshold for the second LBT.

According to the present disclosure, an efficient channel access procedure may be performed by listen-before-talk (LBT) based on beams or LBT based on beam groups.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 7 illustrates a wireless communication system supporting an unlicensed band;

FIG. 12 is a diagram for explaining a resource allocation method for UL transmission in a shared spectrum applicable to the present disclosure;

FIGS. 14, 15, 16, 17, and 18 are diagrams illustrating beam management in the NR system;

DETAILED DESCRIPTION

Figure 1:
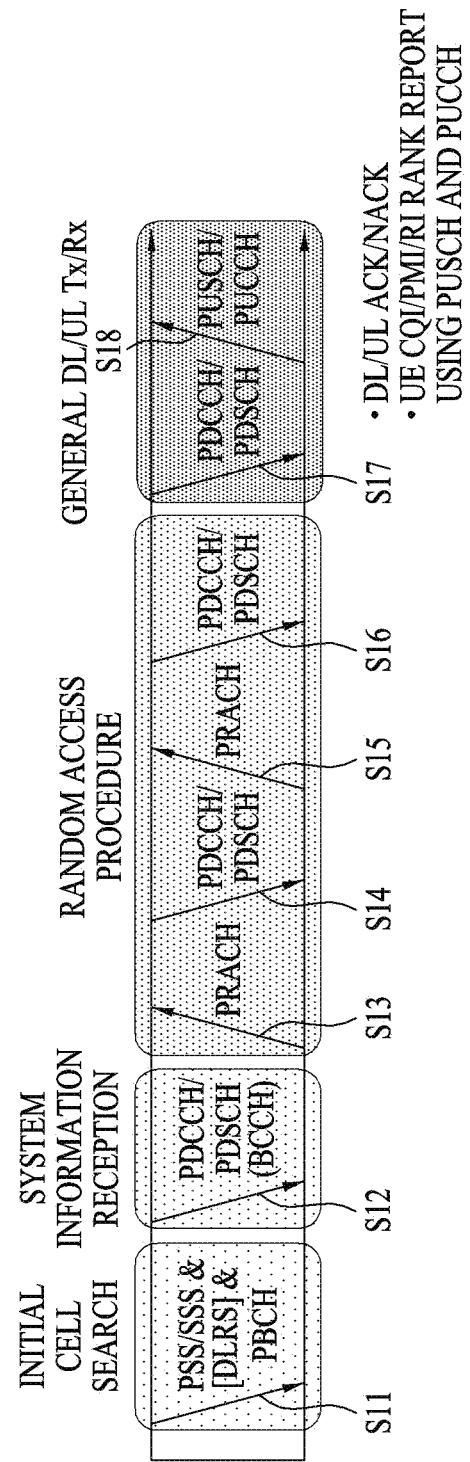
FIG. 1 illustrates physical channels and a general signal transmission method using the physical channels in a 3rd generation partnership project (3GPP) system as an exemplary wireless communication system.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
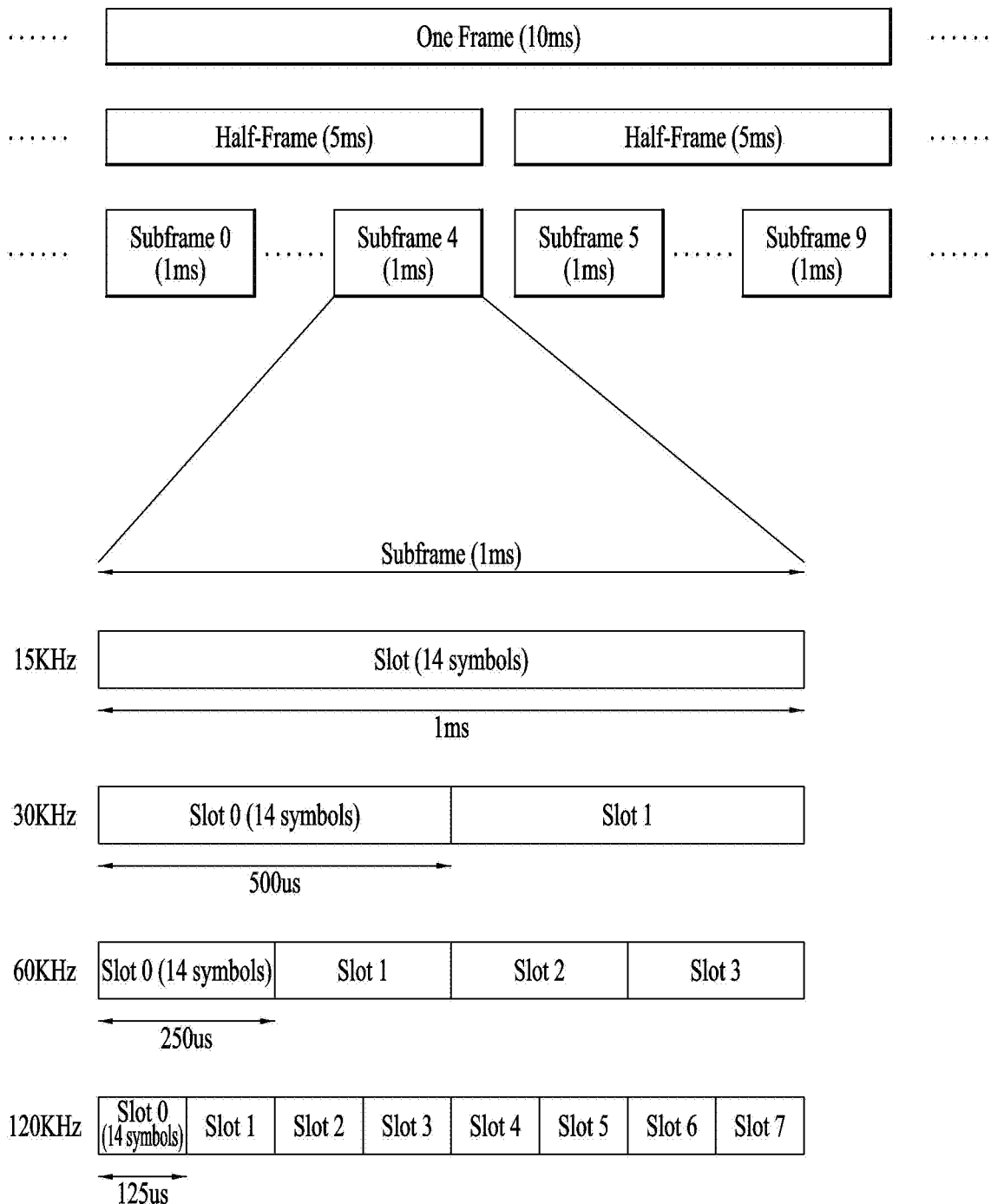
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15*2^u) | $N_{symb}^{slot}$ | $N_{slot}^{frame, u}$ | $N_{slot}^{subframe, u}$ |
|---|---|---|---|
| 120 KHz (u = 3) | 14 | 80 | 8 |
| 240 KHz (u = 4) | 14 | 160 | 16 |

$N_{symb}^{slot}$: number of symbols in a slot
$N_{slot}^{frame,u}$: number of slots in a frame
$N_{slot}^{subframe,u}$: number of slots in a subframe Table 2 illustrates that the number of symbols per slot, the number of slots per frame, and the number of slots per subframe vary according to SCSs in an extended CP case.

TABLE 2

| SCS (15*2^u) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5$^{th}$ generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 KHz |
| FR2 | 24250 MHz-52600 MHz | 60, 120, 240 KHz |

Figure 3:
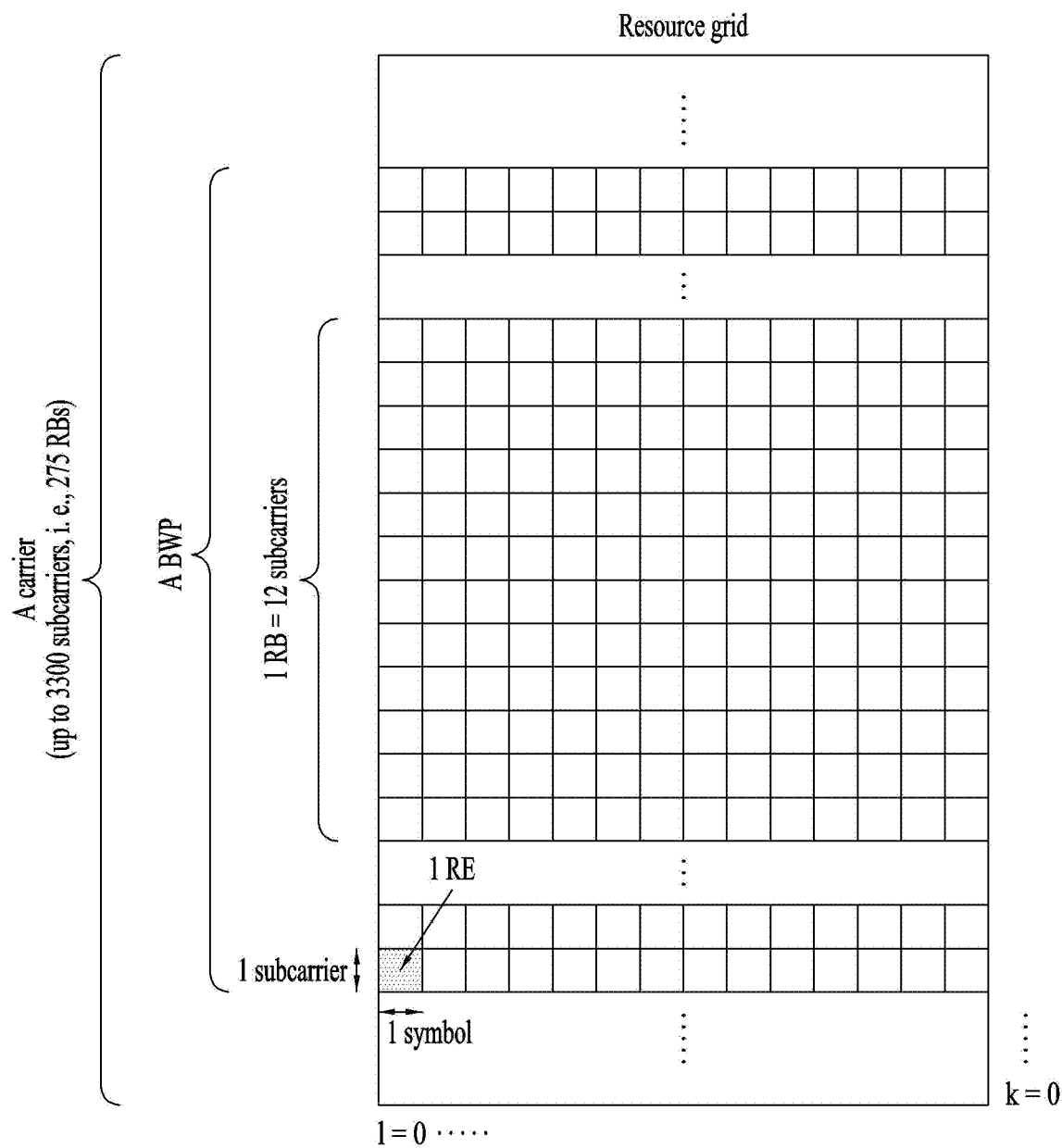
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
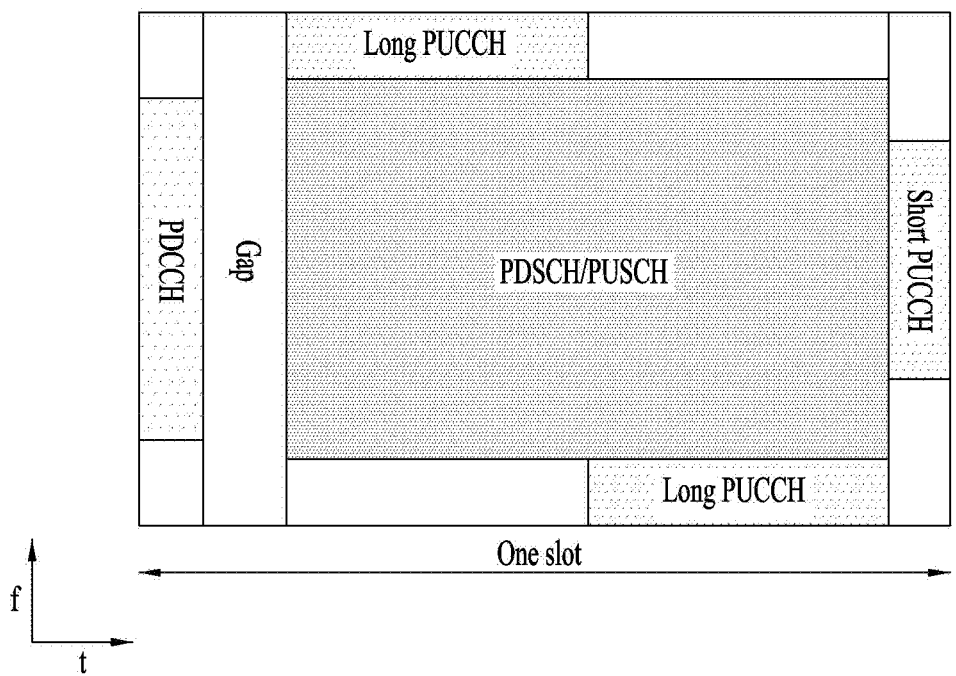
FIG. 4 illustrates exemplary mapping of physical channels in a slot.

FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

Now, a detailed description will be given of physical channels.

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSetId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 4-continued

| Type | Search Space | RNTI | Use Case |
|---|---|---|---|
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.—searchSpaceId: indicates the ID of the SS set.
   controlResourceSetId: indicates a CORESET associated with the SS set.
   monitoringSlotPeriodicityAndOffset: indicates a PDCCH monitoring periodicity (in slots) and a PDCCH monitoring offset (in slots).
   monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.
   nrofCandidates: indicates the number of PDCCH candidates (e.g., one of 0, 1, 2, 3, 4, 5, 6, and 8) for each AL={1, 2, 4, 8, 16}.
   searchSpaceType: indicates whether the SS type is CSS or USS.
   DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 5 illustrates exemplary DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

UL Channel Structures

A UE transmits a related signal to the BS on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.
   SR: information used to request UL-SCH resources.
   HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.
   CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4 , #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

Figure 5:
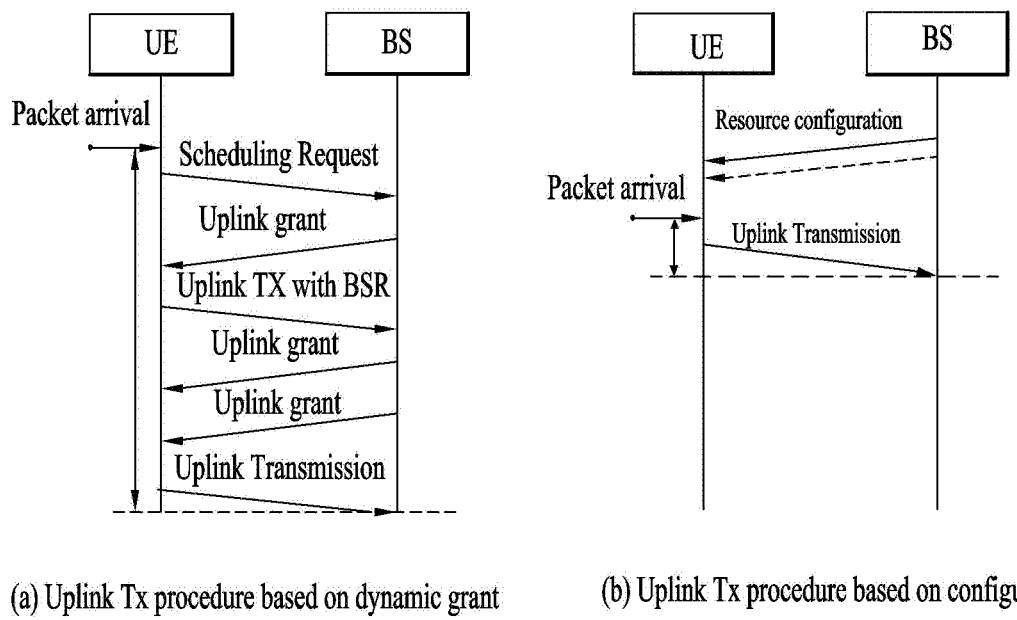
FIG. 5 illustrates exemplary uplink (UL) transmission operations of a user equipment (UE)

FIG. 5 illustrates exemplary UL transmission operations of a UE. The UE may transmit an intended packet based on a DG (FIG. 5(a)) or based on a CG (FIG. 5(b)).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 6:
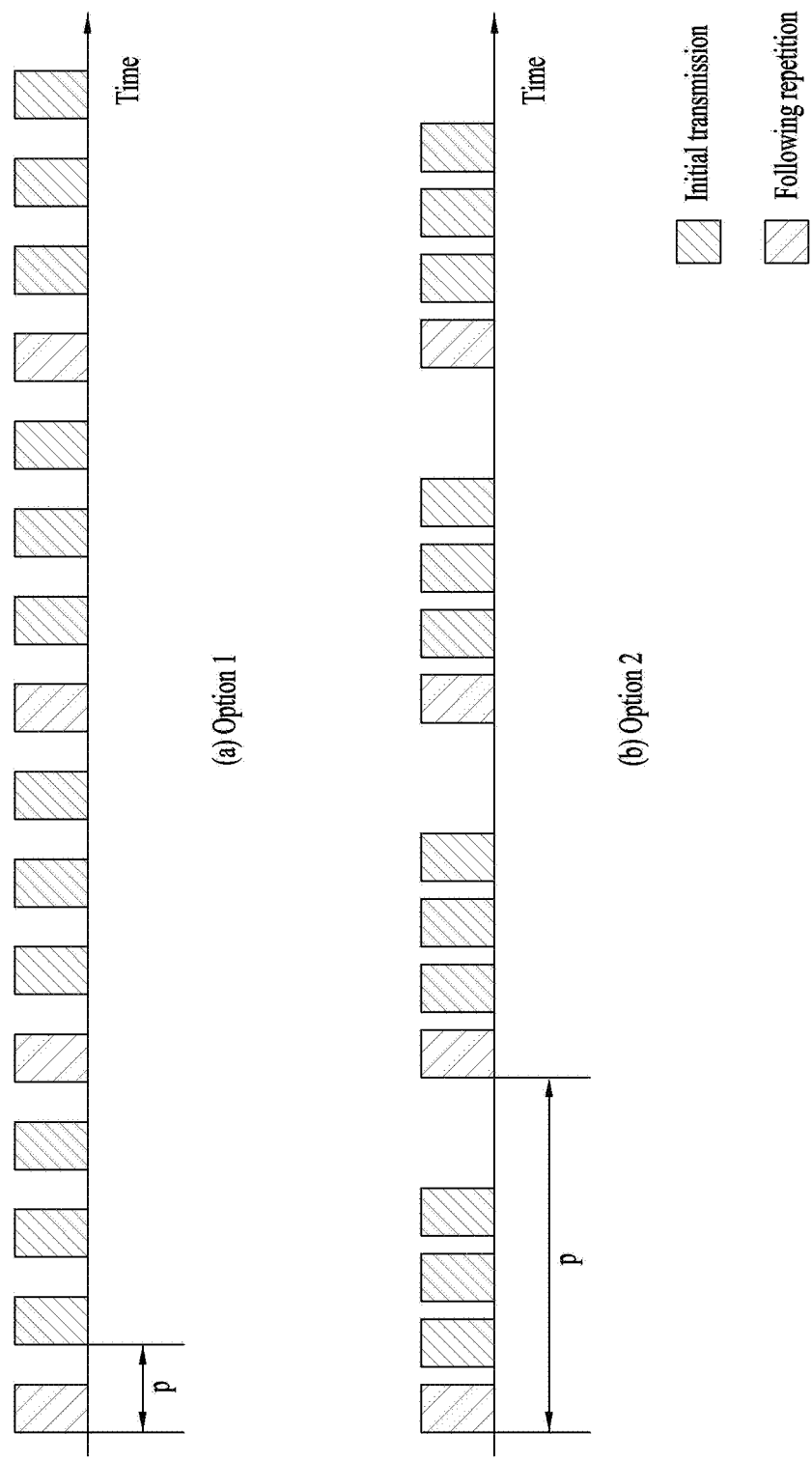
FIG. 6 illustrates exemplary repeated transmissions based on a configured grant.

FIG. 6 illustrates exemplary repeated transmissions based on a CG.

The UE performs repeated transmissions until one of the following conditions is satisfied:

A UL grant for the same TB is successfully received;
The repetition number of the TB reaches K; and
(In Option 2) the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 7(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 7(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}=9$ us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 8:
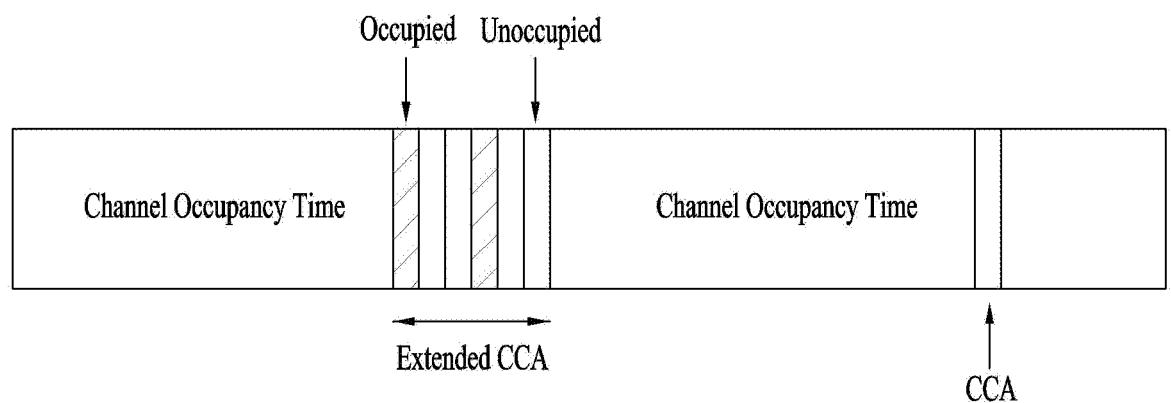
FIG. 8 illustrates an exemplary method of occupying resources in an unlicensed band.

FIG. 8 illustrates an exemplary method of occupying resources in an unlicensed band.

Referring to FIG. 8, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., $X_{thresh}$) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 7 describes an exemplary CAP supported in NR-U.

TABLE 7

| | Type | Explanation |
|---|---|---|
| DL | Type 1 CAP | CAP with random backoff time duration spanned by the sensing slots that are sensed to be idle before a downlink transmission(s) is random |
| | Type 2 CAP | CAP without random backoff |
| | Type 2A, 2B, 2C | time duration spanned by sensing slots that are sensed to be idle before a downlink transmission(s) is deterministic |
| UL | Type 1 CAP | CAP with random backoff time duration spanned by the sensing slots that are sensed to be idle before a downlink transmission(s) is random |
| | Type 2 CAP | CAP without random backoff |
| | Type 2A, 2B, 2C | time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set q∈{4, 5, . . . , 32} and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects N∈{1, 2, . . . , q}, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

An eNB/gNB or UE of an LTE/NR system should also perform LBT for signal transmission in an unlicensed band (referred to as a U-band for convenience). When the eNB or UE of the LTE/NR system transmits a signal, other communication nodes such as a Wi-Fi node should also perform LBT so as not to cause interference with transmission by the eNB or the UE. For example, in the Wi-Fi standard (801.11ac), a CCA threshold is defined as −62 dBm for a non-Wi-Fi signal and −82 dBm for a Wi-Fi signal. For example, when the non-Wi-Fi signal is received by a station (STA) or an access point (AP) with a power of more than −62 dBm, the STA or AP does not transmit other signals in order not to cause interference.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 9:
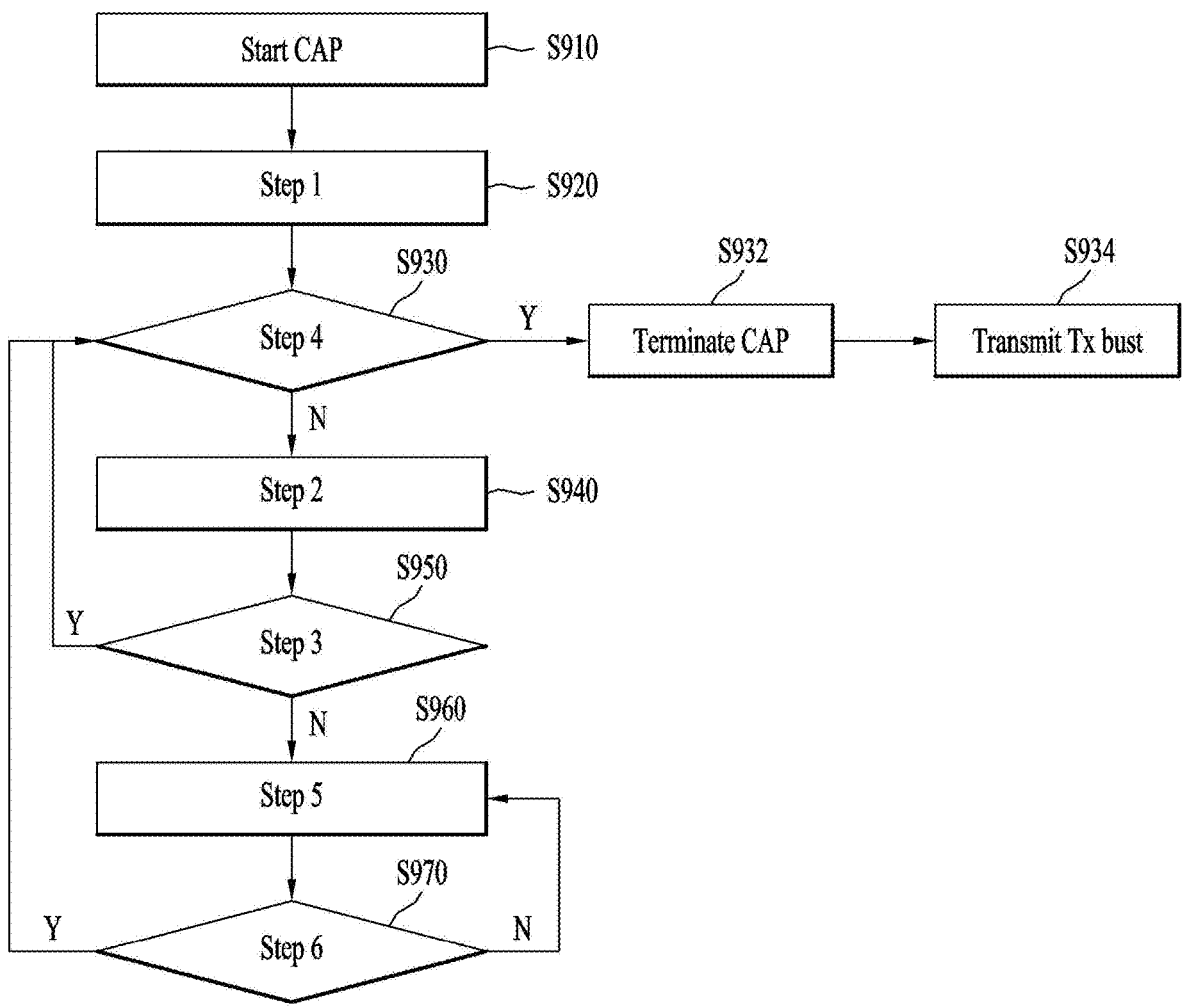
FIG. 9 illustrates an exemplary channel access procedure of a UE for UL signal transmission and/or DL signal transmission in an unlicensed band applicable to the present disclosure.

FIG. 9 illustrates Type 1 CAP among channel access procedures of a UE for UL/DL signal transmission in a U-band applicable to the present disclosure.

First, UL signal transmission in the U-band will be described with reference to FIG. 9.

The UE may sense whether a channel is idle for a sensing slot duration in a defer duration Td. After a counter N is decremented to 0, the UE may perform a transmission (S934). The counter N is adjusted by sensing the channel for additional slot duration(s) according to the following procedure.

Step 1) Set N=$N_{init}$ where $N_{init}$ is a random number uniformly distributed between 0 and $CW_p$, and go to step 4 (S920).

Step 2) If N>0 and the UE chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y) (S930), stop CAP (S932). Else (N), go to step 2.

Step 5) Sense the channel until a busy sensing slot is detected within the additional defer duration $T_d$ or all slots of the additional defer duration $T_d$ are sensed as idle (S960).

Step 6) If the channel is sensed as idle for all slot durations of the additional defer duration $T_d$ (Y), go to step 4. Else (N), go to step 5 (S970).

Table 8 illustrates that $m_p$, a minimum CW, a maximum CW, a maximum channel occupancy time (MCOT), and an allowed CW size applied to a CAP vary according to channel access priority classes.

TABLE 8

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration $T_d$ includes a duration $T_f$ (16 us) immediately followed by $m_p$ consecutive slot durations where each slot duration $T_{sl}$ is 9 us, and $T_f$ includes a sensing slot duration $T_{sl}$ at the start of the 16-us duration. $CW_{min,p} \leq CW_p \leq CW_{max,p}$. $CW_p$ is set to $CW_{min,p}$, and may be updated before Step 1 based on an explicit/implicit reception response to a previous UL burst (e.g., PUSCH) (CW size update). For example, $CW_p$ may be initialized to $CW_{min,p}$ based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration $T_{short\_dl}$ (=25 us). $T_{short\_dl}$ includes a duration Tf (=16 us) and one immediately following sensing slot duration. In the Type 2A UL CAP, $T_f$ includes a sensing slot at the start of the duration. In the Type 2B UL CAP, the UE may transmit a signal immediately after the channel is sensed as idle during a sensing slot duration $T_f$(=16 us). In the Type 2B UL CAP, $T_f$ includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

The biggest difference between autonomous uplink (AUL) of LTE LAA and a CG of NR is a HARQ-ACK feedback transmission method for a PUSCH that the UE has transmitted without receiving a UL grant and the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE LAA, the BS identifies the UE by a UE ID explicitly included in the AUL UCI transmitted together with the PUSCH as well as the DMRS resources.

Now, DL signal transmission in the U-band will be described with reference to FIG. 9.

The BS may perform one of the following U-band access procedures (e.g., channel access procedures (CAPs)) to transmit a DL signal in the U-band.

(1) Type 1 DL CAP Method

In a Type 1 DL CAP, the length of a time duration spanned by sensing slots that are sensed to be idle before transmission(s) is random. The Type 1 DL CAP may be applied to the following transmissions:

transmission(s) initiated by the BS, including (i) a unicast PDSCH with user plane data, or (ii) a unicast PDSCH with user plane data and a unicast PDCCH scheduling the user plane data; or transmission(s) initiated by the BS, including (i) only a discovery burst, or (ii) a discovery burst multiplexed with non-unicast information.

Referring to FIG. 9, the BS may first sense whether a channel is idle for a sensing slot duration of a defer duration Td. Next, if a counter N is decremented to 0, transmission may be performed (S934). The counter N is adjusted by sensing the channel for additional slot duration(s) according to the following procedures.

Step 1) Set N=Ninit where Ninit is a random number uniformly distributed between 0 and CWp, and go to step 4 (S920).

Step 2) If N>0 and the BS chooses to decrement the counter, set N=N−1 (S940).

Step 3) Sense the channel for an additional slot duration, and if the additional slot duration is idle (Y), go to step 4. Else (N), go to step 5 (S950).

Step 4) If N=0 (Y), stop a CAP (S1232 (? S932)). Else (N), go to step 2 (S930).

Step 5) Sense the channel until a busy sensing slot is detected within the additional defer duration Td or all slots of the additional defer duration Td are sensed to be idle (S960).

Step 6) If the channel is sensed to be idle for all slot durations of the additional defer duration Td (Y), go to step 4. Else (N), go to step 5 (S970).

Table 9 illustrates that mp, a minimum CW, a maximum CW, an MCOT, and an allowed CW size, which are applied to a CAP, vary according to channel access priority classes.

TABLE 9

| Channel Access Priority Class (p) | $m_p$ | CWmin, p | CWmax, p | Tmcot, p | allowed CWp sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration Td includes a duration Tf (16 μs) immediately followed by mp consecutive sensing slot durations where each sensing slot duration Tsl is 9 μs, and Tf includes the sensing slot duration Tsl at the start of the 16-μs duration.

CWmin,p<=CWp<=CWmax,p. CWp is set to CWmin,p, and may be updated (CW size update) before Step 1 based on HARQ-ACK feedback (e.g., ratio of ACK signals or NACK signals) for a previous DL burst (e.g., PDSCH). For example, CWp may be initialized to CWmin,p based on HARQ-ACK feedback for the previous DL burst, may be increased to the next highest allowed value, or may be maintained at an existing value.

(2) Type 2 DL CAP Method

In a Type 2 DL CAP, the length of a time duration spanned by sensing slots sensed to be idle before transmission(s) is deterministic. Type 2 DL CAPs are classified into Type 2A DL CAP, Type 2B DL CAP, and Type 2C DL CAP.

The Type 2A DL CAP may be applied to the following transmissions. In the Type 2A DL CAP, the BS may transmit a signal immediately after a channel is sensed to be idle during at least a sensing duration Tshort_dl=25 μs. Tshort_dl includes a duration Tf (=16 μs) and one immediately following sensing slot duration. Tf includes the sensing slot at the start of the duration.

Transmission(s) initiated by the BS, including (i) only a discovery burst, or (ii) a discovery burst multiplexed with non-unicast information, or Transmission(s) of the BS after a gap of 25 μs from transmission(s) by the UE within shared channel occupancy.

The Type 2B DL CAP is applicable to transmission(s) performed by the BS after a gap of 16 μs from transmission(s) by the UE within shared channel occupancy. In the Type 2B DL CAP, the BS may transmit a signal immediately after a channel is sensed to be idle during Tf=16 μs. Tf includes a sensing slot within the last 9 μs of the duration. The Type 2C DL CAP is applicable to transmission(s) performed by the BS after a maximum of a gap of 16 μs from transmission(s) by the UE within shared channel occupancy. In the Type 2C DL CAP, the BS does not sense a channel before performing transmission.

In a wireless communication system supporting a U-band, one cell (or carrier (e.g., CC)) or BWP configured for the UE may consist of a wideband having a larger BW than in legacy LTE. However, a BW requiring CCA based on an independent LBT operation may be limited according to regulations. If a subband (SB) in which LBT is individually performed is defined as an LBT-SB, a plurality of LBT-SBs may be included in one wideband cell/BWP. A set of RBs constituting an LBT-SB may be configured by higher-layer (e.g., RRC) signaling. Accordingly, one or more LBT-SBs may be included in one cell/BWP based on (i) the BW of the cell/BWP and (ii) RB set allocation information.

Figure 10:
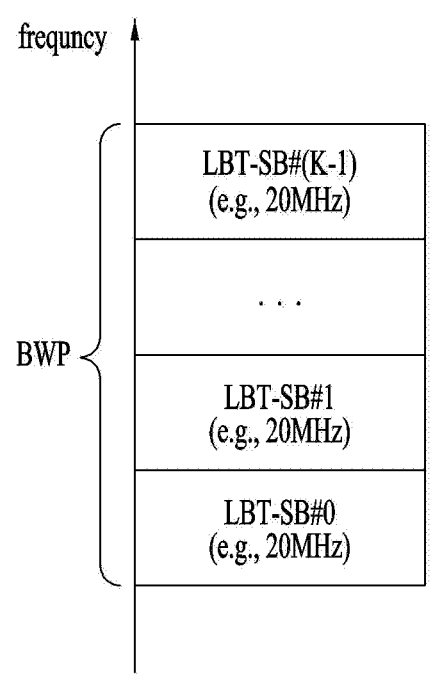
FIG. 10 is a diagram illustrating a plurality of listen-before-talk subbands (LBT-SBs) applicable to the present disclosure.

FIG. 10 illustrates that a plurality of LBT-SBs is included in a U-band.

Referring to FIG. 10, a plurality of LBT-SBs may be included in the BWP of a cell (or carrier). An LBT-SB may be, for example, a 20-MHz band. The LBT-SB may include a plurality of contiguous (P)RBs in the frequency domain and thus may be referred to as a (P)RB set. Although not illustrated, a guard band (GB) may be included between the LBT-SBs. Therefore, the BWP may be configured in the form of {LBT-SB #0 (RB set #0)+GB #0+LBT-SB #1 (RB set #1+GB #1)+ . . . +LBT-SB #(K−1) (RB set #(K−1))}. For convenience, LBT-SB/RB indexes may be configured/defined to be increased as a frequency band becomes higher starting from a low frequency band.

Figure 11:
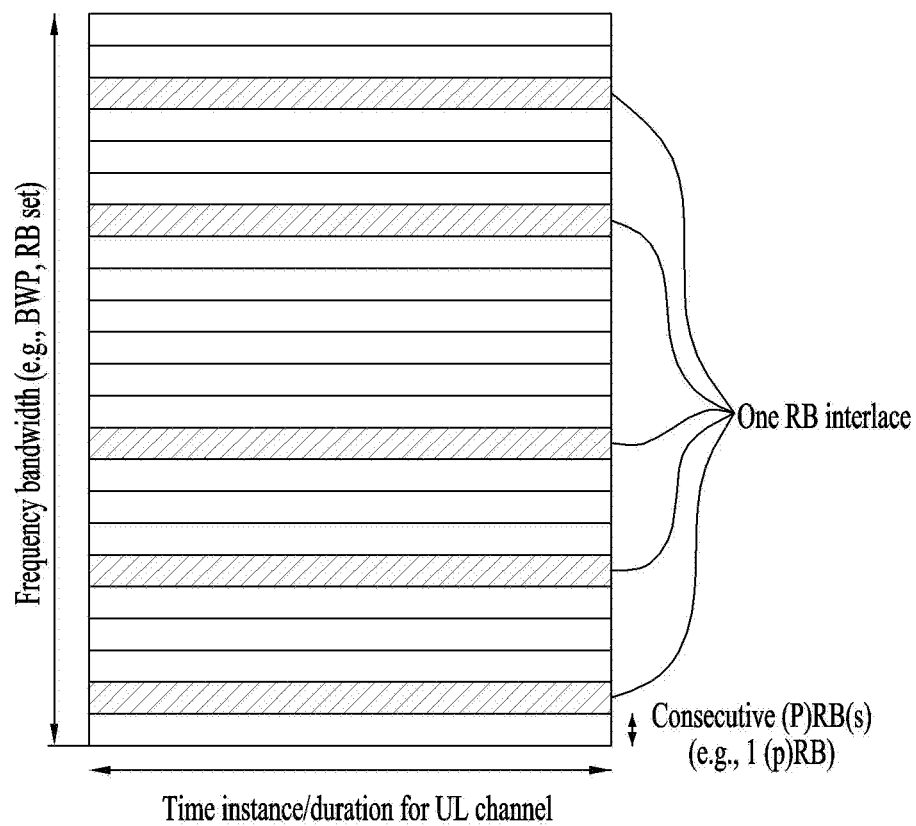
FIG. 11 is a diagram for explaining a resource block (RB) interlace applicable to the present disclosure.

FIG. 11 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). For convenience, such a set of inconsecutive RBs is defined as "RB interlace" (simply, interlace).

Referring to FIG. 11, a plurality of RB interlaces (simply, a plurality of interlaces) may be defined in a frequency bandwidth. Here, the frequency bandwidth may include a (wideband) cell/CC/BWP/RB set, and the RB may include a PRB. For example, interlace #m∈{0, 1, . . . , M−1} may consist of (common) RBs {m, M+m, 2M+m, 3M+m, . . . }, where M denotes the number of interlaces. A transmitter (e.g., UE) may use one or more interlaces to transmit a signal/channel. The signal/channel may include a PUCCH or PUSCH.

For UL resource allocation type 2, RB assignment information (e.g., frequency domain resource assignment in FIG. 11 may indicate to the UE up to M interlace indices (where M is a positive integer) and $N_{RB\text{-}set}^{BWP}$ consecutive RB sets (for DCI 0_1). In this case, the RB set corresponds to a frequency resource in which a channel access procedure (CAP) is performed in a shared spectrum, which consists of a plurality of contiguous (P) RBs. The UE may determine RB(s) corresponding to the intersection of indicated interlaces and indicated RB set(s) [including guard bands between the indicated RB set(s) (if present)] as a frequency resource for PUSCH transmission. In this case, guard bands between the consecutive RB set(s) may also be used as the frequency resource for PUSCH transmission. Therefore, the RB(s) corresponding to the intersection of (1) the indicated interlaces and (2) [the indicated RB set(s)+the guard band between the indicated RB set(s) (if present)] may be determined as the frequency resource for PUSCH transmission.

If u=0, X MSBs (where X is a positive integer) MSBs of the RB assignment information indicate interlace index set (m0+1) allocated to the UE, and the indication information is composed of a resource indication value (RIV). If 0<=RIV<M(M+1)/2, l=0, 1, . . . , L−1. The RIV corresponds to (i) a starting interlace index, mo and (ii) the number L of consecutive interlace indices (L is a positive integer). The RIV may be defined as follows.

[Equation 1]
if $(L - 1) \leq \lfloor M/2 \rfloor$ then
$RIV = M(L_\square - 1) + m_0$
else
$RIV = M(M - L + 1) + (M - 1 - m_0)$ In Equation 1, M denotes the number of interlaces, mo denotes the starting interlace index, L denotes the number of consecutive interlaces, and $\lfloor \square \rfloor$ denotes the flooring function.

If RIV>=M(M+1)/2, the RIV corresponds to (i) the start interlace index, mo and (ii) a set of 1 values as shown in Table 10.

TABLE 10

| RIV − M(M + 1)/2 | $m_0$ | l |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

If u=1, X MSBs (where X is a positive integer) of the RB assignment information (i.e., frequency domain resource assignment) includes a bitmap indicating interlaces allocated to the UE. The size of the bitmap is M bits, and each bit corresponds to each interlace. For example, interlaces #0 to #(M−1) may be one-to-one mapped from the MSB to the LSB of the bitmap, respectively. If a bit value of the bitmap is 1, a corresponding interlace is allocated to the UE. Otherwise, the corresponding interlace is not allocated to the UE. If u=0 and u=1, $$Y = \left\lceil \log 2 \frac{N_{RB-set}^{BWP}(N_{RB-set}^{BWP} + 1)}{2} \right\rceil LSBs$$

of the RB assignment information may indicate RB set (s) continuously allocated to the UE for the PUSCH. Here, $N^{BWP}_{RB-set}$ denotes the number of RB sets configured in a BWP, and $\lceil \square \rceil$ denotes the ceiling function. The PUSCH may be scheduled by DCI format 0_1, a Type 1 configured grant, and a Type 2 configured grant. The resource allocation information may be composed of the RIV (hereinafter referred to as $RIV_{RBset}$). If $0<=RIV_{RBset}<N^{BWP}_{RB-set}(N^{BWP}_{RB-set}+1)/2$, l=0, 1, . . . , $L_{RBset-1}$. The RIV corresponds to (i) a starting RB set ($RB_{setSTART}$) and (ii) the number of consecutive RB set(s) ($L_{RBset}$) (where $L_{RBset}$ is a positive integer). The RIV may be defined as follows.

[Equation 2]
if $(L_{RBset} - 1) \leq \lfloor N_{RB-set}^{BWP}/2 \rfloor$ then
$RIV_{RBset} = N_{RB-set}^{BWP}(L_{RBset} - 1) + RBset_{START}$
else
$RIV_{RBset} = N_{RB-set}^{BWP}(N_{RB-set}^{BWP} - L_{RBset} + 1) + (N_{RB-set}^{BWP} - 1 - RBset_{START})$ In Equation 2, $L_{RBset}$ denotes the number of consecutive RB set(s), $N^{BWP}_{RB-set}$ denotes the number of RB sets configured in a BWP, $RB_{setSTART}$ denotes the index of a starting RB set, and $\lfloor \square \rfloor$ denotes the flooring function.

FIG. 12 illustrates resource assignment for UL transmission in a shared spectrum.

Referring to FIG. 12(a), RBs belonging to interlace #1 in RB set #1 may be determined as a PUSCH resource based on resource assignment information for a PUSCH indicating {interlace #1, RB set #1}. That is, RBs corresponding to the intersection of {interlace #1, RB set #1} may be determined as the PUSCH resource. Referring to FIG. 12(b), RBs belonging to interlace #2 in RB sets #1 and #2 may be determined as the PUSCH resource based on the resource assignment information for the PUSCH indicating {interlace #2, RB sets #1 and #2}. In this case, a guide band (GB) (i.e., GB #1) between RB set #1 and RB set #2 may also be used as the PUSCH transmission resource. That is, RBs corresponding to the intersection of {interlace #1, RB sets #1 and #2, GB #1} may be determined as the PUSCH resource. In this case, a GB (i.e., GB #0) which is not between RB set #1 and RB set #2 is not used as the PUSCH transmission resource even if the GB is adjacent to RB sets #1 and #2.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 13:
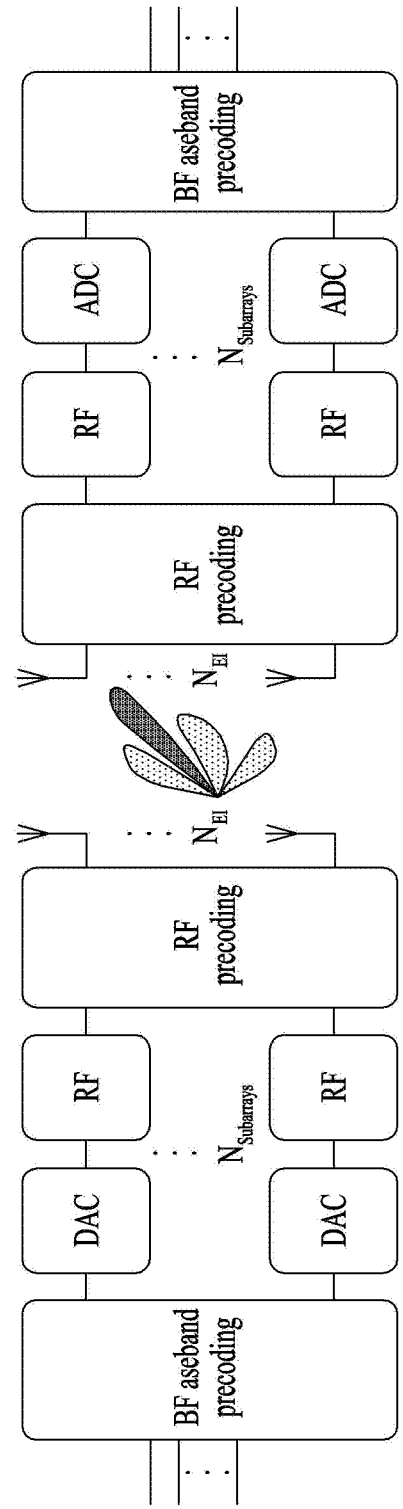
FIG. 13 is a diagram illustrating analog beamforming in the NR system.

FIG. 13 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

Beam measurement: an operation by which the BS or UE measures the characteristics of a received beamformed signal Beam determination: an operation by which the BS or UE selects its Tx/Rx beams Beam sweeping: an operation of covering a spatial domain by using Tx and/or Rx beams for a prescribed time interval according to a predetermined method Beam report: an operation by which the UE reports information about a signal beamformed based on the beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 14:
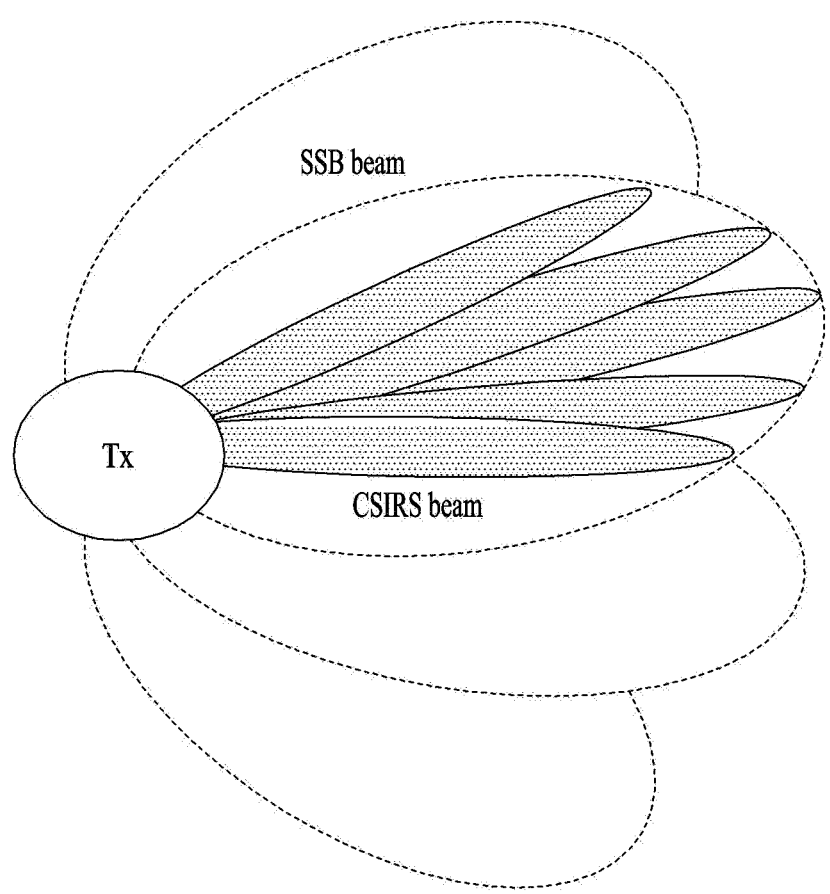

FIG. 14 is a diagram illustrating exemplary BF using an SSB and a CSI-RS.

Referring to FIG. 14, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

1. DL BM Using SSB

Figure 15:
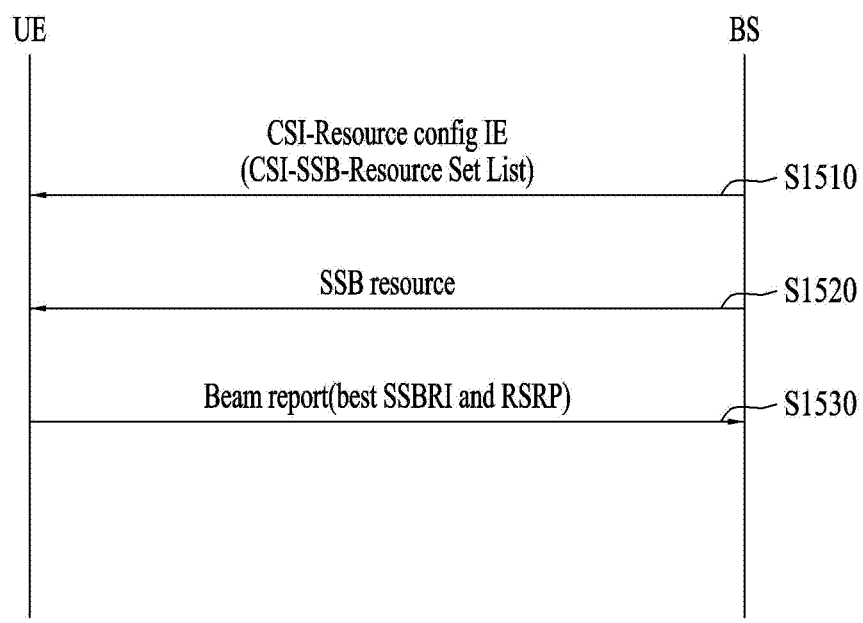

FIG. 15 is a diagram illustrating a signal flow for an exemplary DL BM procedure using an SSB.

An SSB-based beam report is configured during CSI/beam configuration in RRC_CONNECTED mode.

A UE receives a CSI-ResourceConfig information element (IE) including CSI-SSB-ResourceSetList for SSB resources used for BM from a BS (S1510). The RRC parameter, CSI-SSB-ResourceSetList is a list of SSB resources used for BM and reporting in one resource set. The SSB resource set may be configured as {SSBx1, SSBx2, SSBx3, SSBx4}. SSB indexes may range from 0 to 63.

The UE receives signals in the SSB resources from the BS based on CSI-SSB-ResourceSetList (S1520).

When CSI-RS reportConfig related to an SSBRI and RSRP reporting has been configured, the UE reports a best SSBRI and an RSRP corresponding to the best SSBRI to the BS (S1530). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals 2. DL BM Using CSI-RS The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 12 illustrates another exemplary DL BM procedure using a CSI-RS.

FIG. 16(a) illustrates an Rx beam refinement process of a UE, and FIG. 16(b) illustrates a Tx beam sweeping process of a BS. Further, FIG. 16(a) is for a case in which Repetition is set to 'ON', and FIG. 16(b) is for a case in which Repetition is set to 'OFF'.

With reference to FIGS. 16(a) and 17(a), an Rx beam determination process of a UE will be described below.

FIG. 17(a) is a diagram illustrating a signal flow for an exemplary Rx beam determination process of a UE.

The UE receives an NZP CSI-RS resource set IE including an RRC parameter 'Repetition' from a BS by RRC signaling (S1710). The RRC parameter 'Repetition' is set to 'ON' herein.

The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1720).

The UE determines its Rx beam (S1730).

The UE skips CSI reporting (S1740). That is, the UE may skip CSI reporting, when the RRC parameter 'Repetition' is set to 'ON'.

With reference to FIGS. 16(b) and 17(b), a Tx beam determination process of a BS will be described below.

FIG. 17(b) is a diagram illustrating an exemplary Tx beam determination process of a BS.

A UE receives an NZP CSI-RS resource set IE including an RRC parameter 'Repetition' from the BS by RRC signaling (S1750). When the RRC parameter 'Repetition' is set to 'OFF', this is related to a Tx beam sweeping process of the BS.

The UE receives signals in resource(s) of a CSI-RS resource set for which the RRC parameter 'Repetition' is set to 'OFF' on different Tx beams (or DL spatial domain Tx filters) of the BS (S1760).

The UE selects (or determines) a best beam (S1770).

The UE reports the ID (e.g., CRI) of the selected beam and related quality information (e.g., an RSRP) to the BS (S1780). That is, the UE reports a CRI and an RSRP corresponding to the CRI, when a CSI-RS is transmitted for BM.

Figure 18:
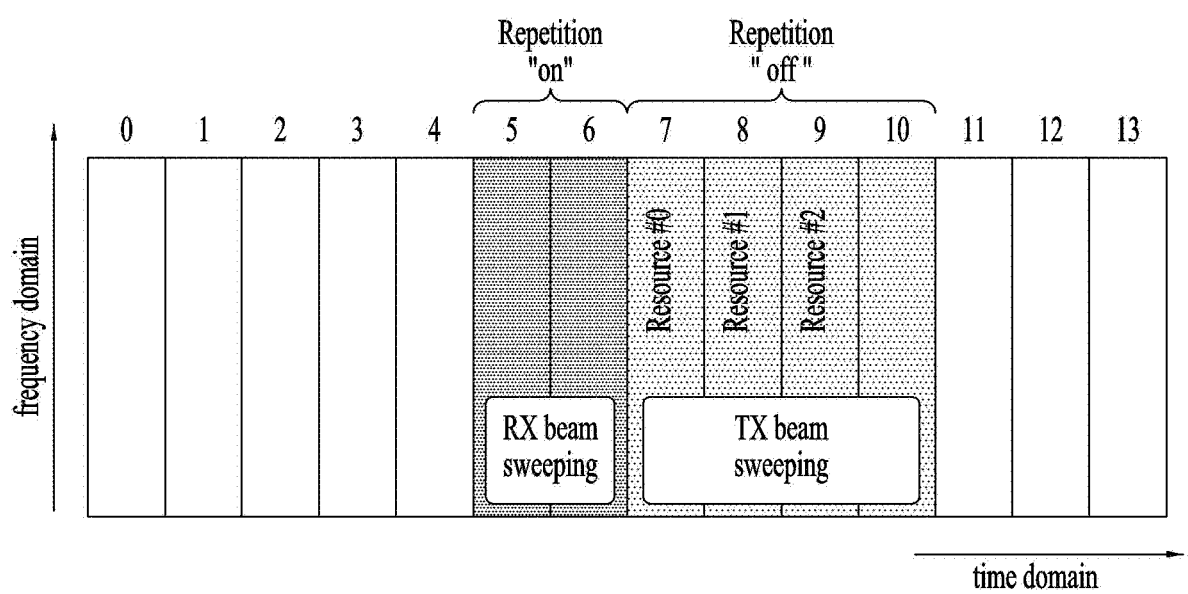

FIG. 18 is a diagram illustrating exemplary resource allocation in the time and frequency domains, which is related to the operation of FIG. 16.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 11 describes an example of a TCI-State IE. The TC-State IE is related to a QCL type corresponding to one or two DL RSs.

TABLE 11

```
-- ASN1START
-- TAG-TCI-STATE-START
TCI-State ::=            SEQUENCE {
  tci-StateId              TCI-StateId,
  qcl-Type1                QCL-Info,
  qcl-Type2                QCL-Info
  ...
}
QCL-Info ::=             SEQUENCE {
  cell                     ServCellIndex
  bwp-Id                   BWP-Id
  referenceSignal          CHOICE {
    csi-rs                   NZP-CSI-RS-ResourceId,
    ssb                      SSB-Index
  },
  qcl-Type                 ENUMERATED {typeA, typeB, typeC,
typeD},
  ...
}
-- TAG-TCI-STATE-STOP
-- ASN1STOP
```

In Table 11, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 11, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

UL BM Procedure

In UL BM, beam reciprocity (or beam correspondence) between Tx and Rx beams may or may not be established according to the implementation of the UE. If the Tx-Rx beam reciprocity is established at both the BS and UE, a UL beam pair may be obtained from a DL beam pair. However, if the Tx-Rx beam reciprocity is established at neither the BS nor UE, a process for determining a UL beam may be required separately from determination of a DL beam pair.

In addition, even when both the BS and UE maintain the beam correspondence, the BS may apply the UL BM procedure to determine a DL Tx beam without requesting the UE to report its preferred beam.

The UL BM may be performed based on beamformed UL SRS transmission. Whether the UL BM is performed on a set of SRS resources may be determined by a usage parameter (RRC parameter). If the usage is determined as BM, only one SRS resource may be transmitted for each of a plurality of SRS resource sets at a given time instant.

The UE may be configured with one or more SRS resource sets (through RRC signaling), where the one or more SRS resource sets are configured by SRS-ResourceSet (RRC parameter). For each SRS resource set, the UE may be configured with K≥1 SRS resources, where K is a natural number, and the maximum value of K is indicated by SRS_capability.

The UL BM procedure may also be divided into Tx beam sweeping at the UE and Rx beam sweeping at the BS similarly to DL BM.

Figure 19:
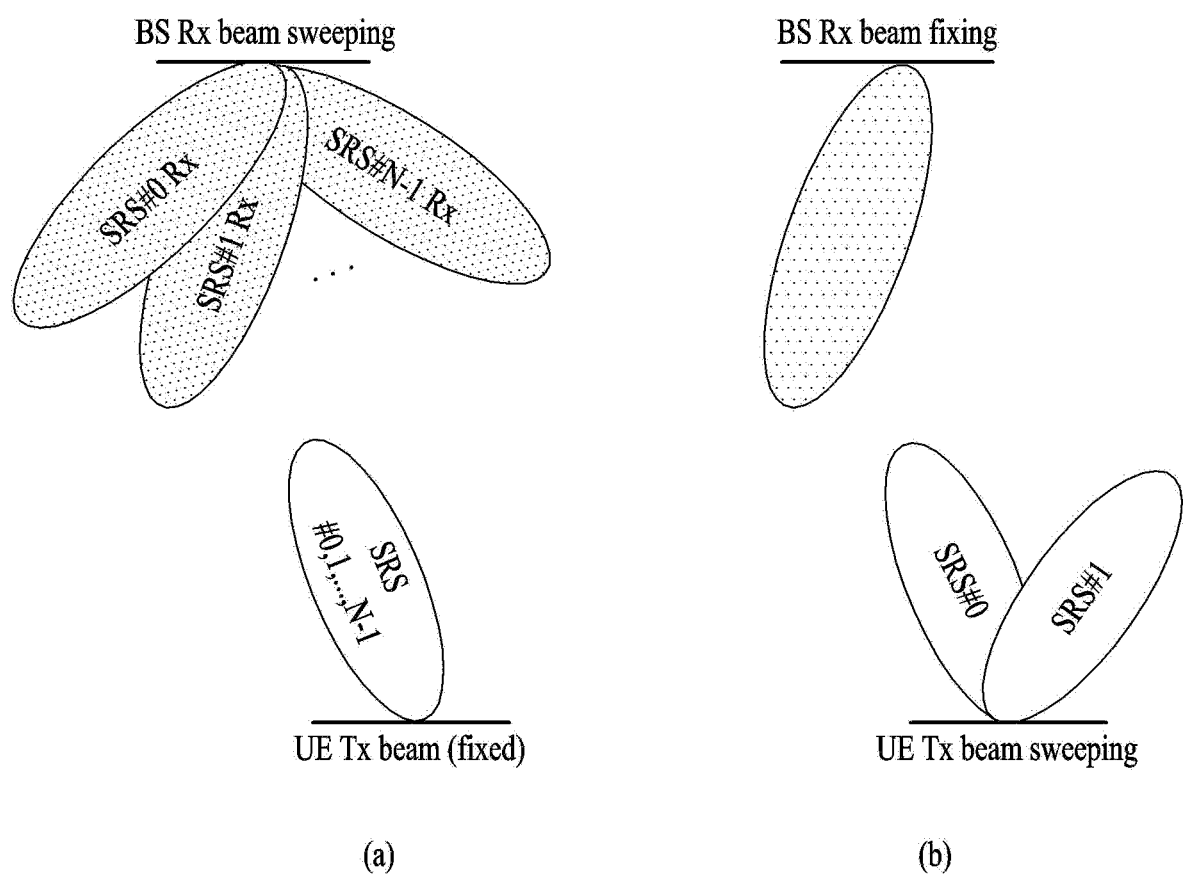
FIGS. 19 and 20 are diagrams illustrating a sounding reference signal applicable to the present disclosure.

FIG. 19 illustrates an example of a UL BM procedure based on an SRS.

FIG. 19(a) shows a process in which the BS determines Rx beamforming, and FIG. 19(b) shows a process in which the UE performs Tx beam sweeping.

Figure 20:
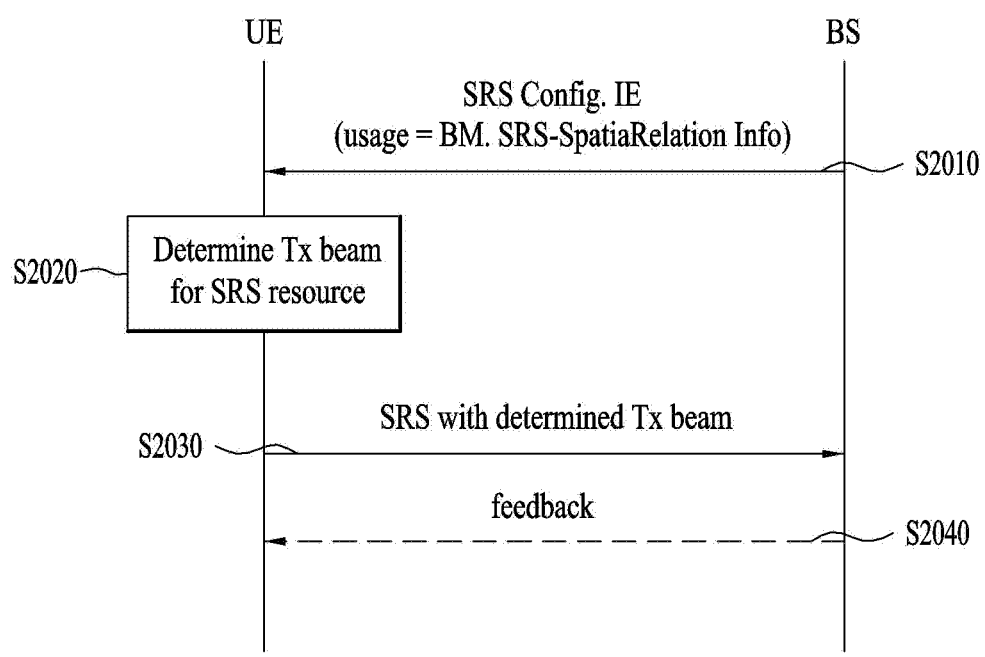

FIG. 20 is a flowchart illustrating an example of a UL BM procedure based on an SRS.

The UE receives RRC signaling (e.g., SRS-Config IE) including a usage parameter (RRC parameter) set to BM from the BS (S2010). The SRS-Config IE is used to configure SRS transmission. The SRS-Config IE includes a list of SRS resources and a list of SRS resource sets. Each SRS resource set refers to a set of SRS resources.

The UE determines Tx beamforming for SRS resources to be transmitted based on SRS-SpatialRelation Info included in the SRS-Config IE (S2020). Here, the SRS-SpatialRelation Info is configured for each SRS resource and indicates whether the same beamforming as that used for an SSB, a CSI-RS, or an SRS is applied for each SRS resource.

If SRS-SpatialRelationInfo is configured for the SRS resources, the same beamforming as that used in the SSB, CSI-RS, or SRS is applied and transmitted. However, if SRS-SpatialRelationInfo is not configured for the SRS resources, the UE randomly determines the Tx beamforming and transmits an SRS based on the determined Tx beamforming (S2030).

For a P-SRS in which 'SRS-ResourceConfigType' is set to 'periodic':
i) If SRS-SpatialRelationInfo is set to SSB/PBCH', the UE transmits the corresponding SRS by applying the same spatial domain transmission filter as a spatial domain reception filter used for receiving the SSB/PBCH (or a spatial domain transmission filter generated from the spatial domain reception filter);
ii) If SRS-SpatialRelationInfo is set to 'CSI-RS', the UE transmits the SRS by applying the same spatial domain transmission filter as that used for receiving the CSI-RS; or
iii) If SRS-SpatialRelationInfo is set to 'SRS', the UE transmits the corresponding SRS by applying the same spatial domain transmission filter as that used for transmitting the SRS.

Additionally, the UE may or may not receive feedback on the SRS from the BS as in the following three cases (S2040).
i) When Spatial_Relation_Info is configured for all SRS resources in an SRS resource set, the UE transmits the SRS on a beam indicated by the BS. For example, if Spatial_Relation_Info indicates the same SSB, CRI, or SRI, the UE repeatedly transmits the SRS on the same beam.
ii) Spatial_Relation_Info may not be configured for all SRS resources in the SRS resource set. In this case, the UE may transmit while changing the SRS beamforming randomly.
iii) Spatial_Relation_Info may be configured only for some SRS resources in the SRS resource set. In this case, the UE may transmit the SRS on an indicated beam for the configured SRS resources, but for SRS resources in which Spatial_Relation_Info is not configured, the UE may perform transmission by applying random Tx beamforming.

A typical CAP performed for transmission in a U-band is LBT. LBT is a mechanism that prevents collision between transmissions by allowing transmission of a corresponding signal when a noise level is less than a certain level as a result of comparing a surrounding interference level measured by the BS and/or the UE that is to transmit signals with a specific threshold such as an ED threshold. Furthermore, in the case of a high frequency band, coverage may be limited due to significant path loss. In order to overcome such a coverage problem, a multi-antenna technique may be used. For example, narrow-beam transmission in which a signal is transmitted by concentrating energy in a specific direction, rather than omnidirectional transmission, may be performed.

In a high-frequency U-band, along with a CAP such as LBT described above, beam-based transmission combined therewith needs to be considered. For example, in order to perform D-LBT in a specific direction, D-LBT may be performed only in the corresponding direction or LBT may be performed in units of a beam group including a beam of the corresponding direction. Then, if a channel is determined to be idle, transmission may be performed. Here, the beam group may include a single beam or a plurality of beams. If the beam group includes omnidirectional beams, D-LBT may be extended to O-LBT.

In the present disclosure, procedures for adjusting a contention window size (CWS) and managing a backoff counter when a CAP is performed based on beams as described above will be reviewed. In addition, procedure for switching between LBT per beam and LBT per beam group and methods of increasing channel access opportunities in the LBT per beam will also be reviewed.

In this case, a relationship may be configured to indicate which beam group each beam is included in. In addition, since a CWS and a backoff counter may be managed for each beam or each beam group, events such as an increase/reset in the CWS or a decrease in the backoff counter may affect each other when LBT is performed. For example, when a NACK is fed back to data transmitted based on LBT in a specific beam direction, and when a CWS therefor increases in the corresponding beam direction, the increase in the CWS may be reflected in a CWS for a beam group including the corresponding beam so that the CWS for the beam group may also increase. On the other hand, the CWS for the beam group may be independently managed regardless of the CWS for the corresponding beam direction. In addition, this may be applied to a backoff counter for each beam and a backoff counter for each beam group. The backoff counter for a beam may affect the backoff counter for a beam group including the beam. The backoff counter for the beam group may be configured regardless of the backoff counter for the beam.

When a specific condition is satisfied, LBT for each beam and LBT for each beam group may be compatible to each other. For UL transmission, the BS may indicate an LBT method to be used among LBT for each beam and LBT for each beam group. For configured grant UL transmission, when a resource is configured, an LBT method to be performed on the resource may also be configured. When delay-sensitive data transmission is indicated with LBT in a specific beam direction, the transmission may not be allowed due to LBT failure. Thus, channel access opportunities may increase by allocating a plurality of LBT opportunities on other beams in a beam group including the corresponding beam.

In the present disclosure, the LBT procedure for each beam or beam group may refer to LBT based on random backoff (e.g., Category-3 (Cat-3) LBT or Category-4 (Cat-4) LBT 4) LBT). According to LBT for each beam, if the energy measured by performing carrier sensing in a specific beam direction is lower than an energy detection (ED) threshold, the channel in the corresponding beam direction may be regarded to be idle. On the contrary, if the measured energy is higher than the ED threshold, the channel in the corresponding beam direction may be determined to be busy.

In the LBT procedure for each beam group, LBT may be performed in all beam directions of each beam group. If there is a representative beam of a specific direction configured/indicated within a beam group, LBT based on random backoff (e.g., Cat-3 LBT or Cat-4 LBT) may be performed for the corresponding representative beam as in multi-CC LBT. The corresponding beam performs a random backoff based LBT (e.g., Category-3 (Cat-3) LBT or Category-4 (Cat-4) LBT) procedure as a representative. For the remaining beams of the beam group, LBT that is not based on random backoff (e.g., Category-1 (Cat-1) LBT or Category-2 (Cat-2) LBT) may be performed. Then, signals and/or channels may be transmitted when the LBT is successful.

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.

Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

Each of the following proposed methods may be implemented in combination with other proposed methods as long as the methods do not contradict with each other.

Prior to describing the proposed methods according to the present disclosure, the overall operation processes of the UE and BS for implementing the proposed methods according to the present disclosure will be described.

Figure 21:
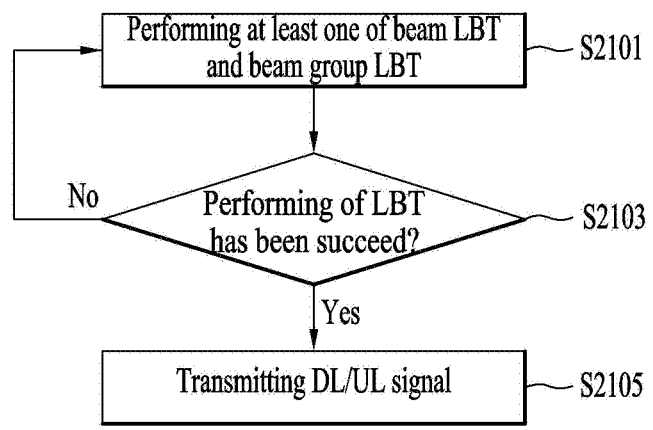
FIGS. 21 and 22 are diagrams illustrating overall operation processes of a UE and a BS according to an embodiment of the present disclosure.
Figure 22:
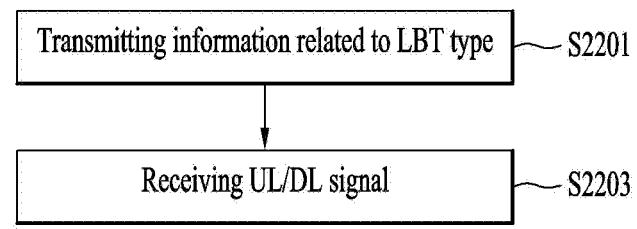

FIGS. 21 and 22 are diagrams for explaining overall operation processes of a UE and a BS according to the present disclosure.

FIG. 21 is a diagram for explaining the overall operation processes of the UE and BS according to an embodiment of the present disclosure.

Referring to FIG. 21, the UE or BS may perform at least one of beam LBT and beam group LBT according to [Proposed Method #2] (S2101). In this case, CWSs and backoff counters of the beam LBT and beam group LBT may be configured according to [Proposed method #1].

The UE or BS may perform at least one of the beam LBT and beam group LBT (S2103). If the LBT is successful, the UE or BS may transmit a UL signal or a DL signal (S2105).

If the LBT fails, the UE or BS may perform at least one of the beam LBT and beam group LBT according to [Proposed Method #2] and/or [Proposed Method #3] (S2101). Depending on whether the LBT is successful, the UE or BS may transmit a UL signal or a DL signal (S2103 to S2105).

Referring to FIG. 22, the BS may transmit information on the type of LBT that the UE needs to perform or is capable of performing among beam LBT and beam group LBT to the UE (S2201). As described in FIG. 21, the UE may perform at least one of the beam LBT and beam group LBT based on the received information according to [Proposed Method #1] to [Proposed Method #3]. The BS may receive a UL signal transmitted according to the result of the LBT (S2203).

When the BS performs LBT for DL signal transmission, step S2201 may be omitted. As described in FIG. 21, the BS may perform at least one of the beam LBT and beam group LBT and then transmit a DL signal according to the result of the LBT, and the UE may receive the DL signal (S2203).

Hereinafter, operation procedures of the UE and BS according to FIGS. 21 and 22 will be described in detail.

In the proposed methods described later, LBT performed for each beam or for each beam group is named directional LBT (D-LBT), and LBT performed in the omni-direction is named omnidirectional LBT (O-LBT). On the other hand, unless specifically mentioned in the following proposed methods, LBT per beam group needs to be interpreted as including O-LBT. That is, considering that the LBT per beam group means LBT based on one or more beams, if the beam group is composed of one or more non-omnidirectional beams, the LBT per beam group may correspond to D-LBT. On the other hand, if an omni-directional beam is included in the beam group, the LBT per beam group may be regarded as O-LBT.

[Proposed Method #1]

Hereinafter, a method of managing a CWS and a backoff counter when each beam is correlated with a beam group will be described.

1. Embodiment #1-1

The CWS and backoff counter for each beam and the CWS and backoff counter for each beam group may depend on each other and be managed together.

In this case, an increase/reset in the CWS and backoff counter in a specific beam direction may be the same as or different from and an increase/reset in the CWS and backoff counter per beam group. For example, the CWS per beam group may increase as much as the CWS in the specific beam direction increases. When the backoff counter in the specific beam direction decreases by 1, the backoff counter per beam group may also decrease by 1.

On the other hand, even if the CWS in the specific beam direction increases by X, the CWS per beam group may increase by Y. Even if the backoff counter in the specific beam direction decreases by 2, the backoff counter per beam group may decrease by 1.

However, in Embodiment #1-1, the CWS and backoff counter for each beam and the CWS and backoff counter for each beam group may affect and depend on each other only when there is association between the beam and beam group. For example, only when the beam is included in the beam group, or when the CWS and backoff counter of the beam and the CWS and backoff counter of the beam group are configured to affect each other, the CWSs and backoff counters may depend on and affect each other.

2. Embodiment #1-2

The CWS and backoff counter for each beam and the CWS and backoff counter for each beam group may be independently managed without affecting each other. For example, even if the CWS and/or backoff counter in a specific beam direction increases, the CWS and/or backoff counter per beam group may increase or decrease because the CWS and/or backoff counter per beam group may count separately.

Embodiment #1-2 may be applied when the CWS and backoff counter per beam group and the CWS and backoff counter of a beam included in a corresponding beam group are configured not to affect each other or when a specific beam is not included in the corresponding beam group and thus they do not affect each other.

Figure 23:
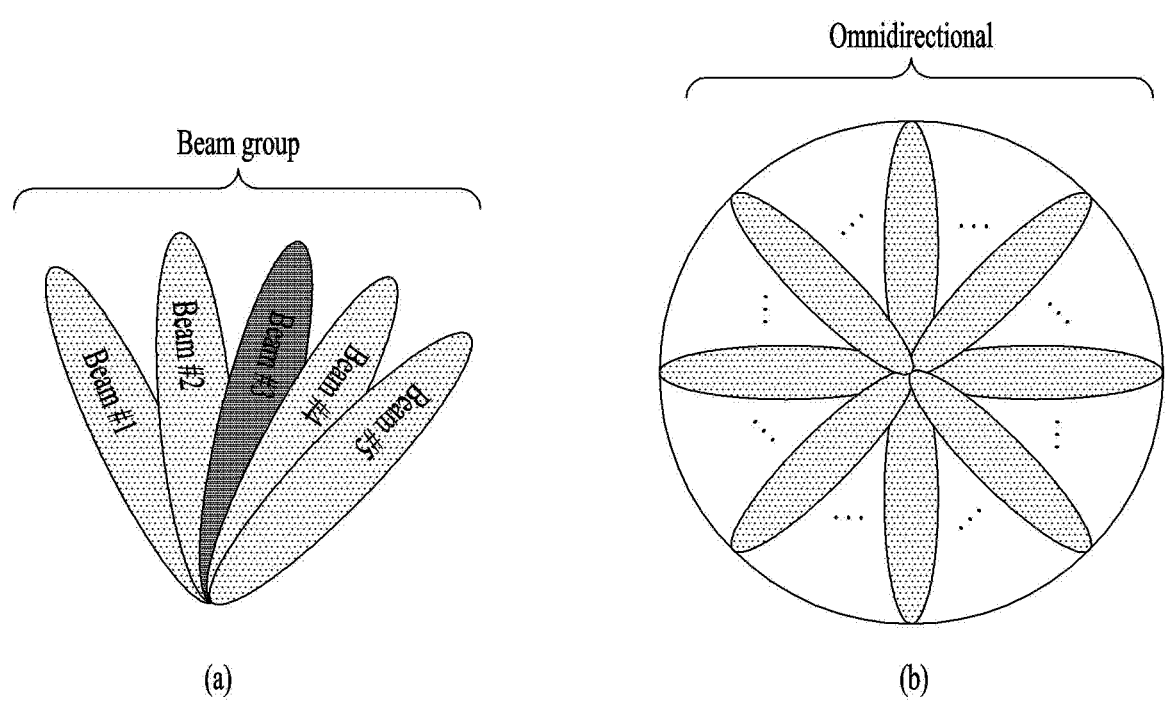
FIG. 23 is a diagram for explaining LBT based on beams and LBT based on beam groups according to an embodiment of the present disclosure.

Depending on whether switching between LBT per beam and LBT per beam group is semi-statically configured through higher layer signaling such as RRC or dynamically indicated through physical layer signaling such as DCI, the CWS and backoff counter may be managed according to either Embodiment #1-1 or Embodiment #1-2. In addition, a beam group including each beam may be preconfigured through higher layer signaling and/or physical layer signaling. Referring to FIG. 23(a), the beam group may include a single beam or a plurality of beams. As shown in FIG. 23(b), when beams in all directions, that is, omnidirectional beams, which are a set of beams covering a specific sector in a cell, are included in one beam group, it may mean O-LBT.

Meanwhile, a plurality of beams included in the beam group may be continuous beams as shown in FIG. 23(a), but one beam group may consist of discontinuous beams.

Hereinafter, details of [Proposed Method #1] will be described. To perform transmission in an unlicensed high frequency band, LBT based on random backoff (e.g., Cat-3 LBT or Cat-4 LBT) may be performed in all directions as in the CAP of NR-U operating in the sub-7 GHz band. However, when a beam is formed and transmitted in a specific direction rather than omni-directional transmission, if the energy measured by performing LBT based on random backoff (e.g., Cat-3 LBT or Cat-4 LBT) only in the specific beam direction is lower than a specific threshold, transmission may be performed on the assumption that the corresponding channel is idle.

When LBT is performed in a specific beam direction, the CWS and backoff counter may be managed for each beam. However, the CWS and backoff counter for each beam may be correlated with the CWS and backoff counter managed in a beam group including the corresponding beam.

A relationship between beams and beam groups, that is, a beam group including each beam may be preconfigured through higher layer signaling and/or physical layer signaling. The beam group may consist of a single beam or a plurality of beams. In this case, the plurality of beams may be continuous or discontinuous.

If beams in all directions, that is, omnidirectional beams, which are a set of beams covering a specific sector in a cell, are included in one beam group, it may mean O-LBT.

Therefore, the CWS and backoff counter adjusted during LBT for a specific beam may be associated with the CWS and backoff counter for a beam group including the corresponding beam. Alternatively, the CWSs and backoff counters may be adjusted independently.

In this case, if the beam LBT switches to the beam group LBT according to [Proposed Method #2] and [Proposed Method #3], the CWS and backoff counter of a changed beam group may be an initial CWS and backoff counter of the beam group LBT, depending on a change in the CWS and backoff counter of the corresponding beam.

That is, while the beam LBT is performed, the CWS and backoff counter of the beam group LBT may change by reflecting changes in the CWS and backoff counter. When the beam LBT switches to the beam group LBT, the CWS and backoff counter of the beam group LBT immediately before switching may become the initial CWS and backoff counter for the beam group LBT after switching. In addition, this may be equally applied even when the beam group LBT switches to the beam LBT. That is, the CWS and backoff counter of the beam LBT may change based on changes in the CWS and backoff counter during the beam group LBT. When the beam group LBT switches to the beam LBT, the CWS and backoff counter of the beam LBT immediately before switching may become the initial CWS and backoff counter of the beam LBT after switching. In other words, if the backoff counter of a beam group is reduced by LBT per beam group, the backoff counter for each beam included in the corresponding beam group may also be reduced. In addition, when the CWS per beam group is reset to the minimum value due to the success of the LBT per beam group, the CWS for each beam included in the beam group may also be reset to the minimum value.

For example, according to Embodiment #1-1, after performing LBT in a specific beam direction, the BS may receive HARQ-ACK feedback including an ACK/NACK from the UE in response to a transmitted signal/channel. For UL, the UE may receive feedback such as an A/N in response to a PUSCH transmitted by the UE, which is obtained from a new data indicator (NDI), code block group transmission information (CBGTI), or configured granted downlink feedback information (CG-DFI) in a UL grant.

If the feedback is a NACK, the CWS of all priority classes for a specific beam may increase to the next value. If the feedback value is an ACK, the CWS may be reset to the initial value or minimum value for the specific beam.

The CWS for each priority class managed in a beam group associated with the specific beam (e.g., a beam group including the specific beam) may increase or be reset according to the CWS of the specific beam. As another example, when a beam group is composed of n1 beams, if a CWS increase event occurs for n2 (n1>n2) beams among the n1 beams, the CWS of the beam group may increase. Alternatively, when the CWS reset event occurs in at least one of the beams included in the beam group, the CWS of the beam group may also be reset.

When CCA is repeatedly performed for LBT based on a random backoff counter (e.g., Cat-3 LBT or Cat-4 LBT) in a specific beam direction, and when an event of decreasing the backoff counter occurs whenever the channel is idle, a backoff counter managed in a beam group associated with the corresponding beam (e.g., a beam group including the corresponding beam) may also decrease. For example, whenever the backoff counter of each beam decreases by X, the backoff counter of a beam group may decrease by Y. Alternatively, assuming that a beam group includes a total of three beams, the backoff counter of the beam group decreases by P whenever the backoff counters of W beams decrease by Z. Here, the values of X, Y, W, and Z may be determined according to the configuration/indication of the BS.

On the other hand, as described above regarding LBT per beam group, when CCA is repeatedly performed, and when an event of decreasing the backoff counter occurs whenever the channel is idle, it may also affect the CWS and backoff counter managed for each beam in a beam group. In this case, an increase/reset in the CWS and a change in the backoff counter in a specific beam direction or beam group may be applied equally or differently. For example, whenever the backoff counter in a specific beam direction decreases by 2, the backoff counter in a beam group associated with the corresponding beam may be configured to decrease by 1. Alternatively, only when a CWS increase or reset event occurs twice in a row for LBT in a specific beam direction, the CWS of a beam group associated with the corresponding beam may be configured to increase once.

According to Embodiment #1-2, an event such as CWS adjustment or backoff counter reduction occurring during LBT in a specific beam direction may not affect the CWS and backoff counter of a beam group including the corresponding beam. Similarly, an event such as CWS adjustment or backoff counter reduction occurring during LBT per beam group may not affect the CWS and backoff counter of each beam in a beam group.

For example, for O-LBT where a specific beam group includes omni-directional beams, the BS may receive HARQ-ACK feedback such as an ACK/NACK for a signal/channel transmitted by the BS based on O-LBT based a random backoff counter (e.g., Cat-3 O-LBT or Cat-4 O-LBT). For UL, the UE may receive feedback such as an A/N in response to a PUSCH transmitted by the UE, which is obtained from an NDI, CBGTI, or CG-DFI in a UL grant.

In this case, if the feedback is a NACK, only the CWS of the corresponding beam group may increase, and the CWS of beams associated with the corresponding beam group may be maintained. If the feedback value is an ACK, only the CWS of the corresponding beam group may be reset, and the CWS of beams associated with the corresponding beam group may be maintained.

During the LBT process for each beam group, only the backoff counter of the beam group may be reduced, and the backoff counter of each beam associated with the beam group may be maintained.

Depending on whether switching between LBT per beam and LBT per beam group is semi-statically configured through higher layer signaling such as RRC or dynamically indicated through physical layer signaling such as DCI, the CWS and backoff counter may be managed according to either Embodiment #1-1 or Embodiment #1-2. For example, when switching between LBT per beam and LBT per beam group is dynamically configured by DCI, the CWS and backoff counter may be configured to affect each other as described in Embodiment #1-1,

[Proposed Method #2]

Hereinafter, a method of applying LBT in a specific beam direction or LBT per beam group and an LBT method for DL/UL transmission when a correlation with a beam group is configured for each beam will be described.

1. Embodiment #2-1

LBT in a specific beam direction may be performed at two steps. That is, LBT based on a random backoff counter (e.g., Cat-3 LBT or Cat-4 LBT) may be performed, and then LBT not based on a random backoff counter (e.g., Cat-1 LBT or Cat-2 LBT) may be simply performed on a beam group including a corresponding beam immediately before transmission. If the channel is idle and the LBT is successful, a signal may be transmitted.

For example, referring to FIG. 23(a), when it is confirmed that the channel is idle by performing the LBT based on the random backoff counter (e.g. Cat-3 D-LBT or Cat-4 D-LBT) for beam #3 in a beam group consisting of beam #1 to beam #5, the LBT based on the random backoff counter (e.g., Cat-2 LBT) may be simply performed on the beam group including beam #1 to beam #5 immediately before transmission. If the channel is idle and the LBT is successful, a signal may be transmitted.

In this case, an energy detection (ED) threshold for the LBT not based on the random backoff counter (e.g., Cat-2 LBT) performed on the beam group may be set higher than or equal to an ED threshold for the LBT based on the random backoff counter (e.g., Cat-3 LBT or Cat-4 LBT) performed in the specific beam direction.

Also, the BS may apply Embodiment #2-1 to all DL transmissions or a specific DL signal/channel. In addition, the BS may dynamically instruct the UE to apply Embodiment #2-1 to all UL transmissions or a specific UL signal/channel through physical layer signaling such as a UL grant. Alternatively, the BS may semi-statically instructs the UE to apply Embodiment #2-1 through higher layer signaling such as RRC.

2. Embodiment #2-2

When LBT per beam group is performed, LBT based on a random backoff counter (e.g., Cat-3 LBT or Cat-4 LBT) may performed on representative beam(s) configured/indicated for a beam group, and LBT not based on a random backoff counter per beam group (e.g., Cat-1 LBT or Cat-2 LBT) may be performed on the remaining beams in the beam group except for the representative beam(s) immediately before transmission. If the channel is idle and the LBT is successful, a signal may be transmitted.

For example, referring to FIG. 23(a), it is assumed that the representative beam of the beam group of FIG. 23(a) is beam #3. When it is confirmed that the channel is idle by performing LBT based on a random backoff counter (e.g., Cat-3 LBT or Cat-4 LBT) on beam #3, LBT not based on a random backoff counter (e.g., Cat-2 LBT) may be performed on beam #1, beam #2, beam #4, and beam #5. If the channel is idle and the LBT is successful, a signal may be transmitted.

The representative beam of the beam group may be semi-statically configured through higher layer signaling such as RRC or dynamically indicated through physical layer signaling such as DCI. If the representative beam of the beam group is not configured/indicated, a beam with the lowest index (e.g., beam #1 in FIG. 23(a)), a beam with the highest index (e.g., beam #5 in FIG. 23(a)), or a beam with the center index (e.g., beam #3 of FIG. 23(a)) within the beam group may be used as the default representative beam. In addition, if the representative beam of the beam group is not configured/indicated, the representative beam may be determined according to agreed rules or rules defined in specifications.

The representative beam of the beam group may be a single beam or a plurality of beams. For example, although the representative beam of the beam group in FIG. 23(a) may be set to beam #3, the representative beam may be three beams: beam #2 to beam #4.

The BS may apply Embodiment #2-2 to all DL transmissions or a specific DL signal/channel. In addition, the BS may dynamically instruct the UE to apply Embodiment #2-2 to all UL transmissions or a specific UL signal/channel through physical layer signaling such as a UL grant. Alternatively, the BS may semi-statically configure to apply Embodiment #2-2 through higher layer signals such as RRC.

3. Embodiment #2-3

For a dynamic grant PUSCH (DG-PUSCH), the BS may dynamically indicate as LBT to be performed before UL transmission either LBT in a specific beam direction or LBT per beam group to the UE through a specific field of a UL grant. The LBT per beam group may include O-LBT. That is, the LBT per beam group may be LBT per beam group including single or multiple beams or O-LBT including all omni-directional beams.

4. Embodiment #2-4

For a configured grant PUSCH (CG-PUSCH), when configuring resources such as time/frequency through higher layer signaling such as RRC, the BS may configure as LBT to be performed before CG-PUSCH transmission either LBT in a specific beam direction or LBT per beam group together. Alternatively, the BS may dynamically indicate either the LBT in the specific beam direction LBT or LBT per beam group as the LBT to be applied before the CG-PUSCH transmission in activation DCI.

For example, for a Type 1 CG-PUSCH, when configuring resources such as time/frequency through higher layer signaling such as RRC, the BS may configure as LBT to be performed before CG-PUSCH transmission either LBT in a specific beam direction or LBT per beam group together. In this case, one specific beam direction or one beam group may be configured for each resource, but a plurality of specific beam directions or a plurality of beam groups may be configured for each resource.

In addition, for a Type 2 CG-PUSCH, the BS may configure resources for CG-PUSCH transmission through higher layer signaling such as RRC. The BS may dynamically indicate as LBT to be applied before the CG-PUSCH transmission either LBT in a specific beam direction or LBT per beam group through activation DCI for activating the CG-PUSCH transmission.

5. Embodiment #2-5

When transmission on a plurality of beams is preconfigured for each CG resource, if the UE transmits a CG-PUSCH after succeeding in LBT in a specific beam direction, the UE may transmit information on the beam direction in which the LBT is successful in configured grant uplink control information (CG-UCI).

For example, referring to FIG. 23(a), if the UE successfully performs LBT on beam #3 and transmits a CG-PUSCH, the UE may transmit information on beam #3 to the BS in CG-UCI included in the CG-PUSCH. In this case, the information on beam #3 included in the CG-UCI may be information on the index of beam #3 and/or information on an SRS resource associated with beam #3.

A beam group including each beam may be preconfigured through higher layer signaling and/or physical layer signaling. Referring to FIG. 23(a), the beam group may include a single beam or a plurality of beams. As shown in FIG. 23(b), when beams in all directions, that is, omnidirectional beams, which are a set of beams covering a specific sector in a cell, are included in one beam group, it may mean O-LBT.

Hereinafter, details of [Proposed Method #2] will be described.

When different radio access technologies (RATs) operate in high-frequency unlicensed bands, fair coexistence therebetween may be an important issue. For example, if WiGig (802.11ad/ay) performs O-LBT in the 60 GHz band as the CAP before transmission, the CAP of WiGig needs to be considered in design of the CAP of the NR UE/BS. The reason for this is that when LBT is performed only in a specific beam direction, the opportunity for channel access may increase because interference caused by other directions may be relatively ignored, but the probability of collision between transmissions may increase compared to when LBT per beam group or O-LBT is performed.

According to Embodiment #2-1, LBT based on a random backoff counter (e.g., Cat-3 LBT or Cat-4 LBT) is performed only in a specific beam direction where transmission is expected. In addition to that, LBT not based on a random backoff counter (e.g., Cat-1 LBT or Cat-2 LBT) may be simply performed on a beam group including the corresponding beam immediately before transmission in consideration of system coexistence. If it is confirmed that the LBT is successful because the channel is idle, a signal may be transmitted. In this case, the ED threshold of LBT not based on random backoff (e.g., Cat-1 LBT or Cat-2 LBT) performed per beam group may set to higher than or equal to the ED threshold of LBT based on random backoff (e.g., Cat-3 LBT or Cat-4 LBT) performed in a specific beam direction.

According to Embodiment #2-2, LBT may be basically performed for each beam group. However, LBT based on a random backoff counter (e.g., Cat-3 LBT or Cat-4 LBT) may be actually performed on representative beam(s) configured/indicated for a beam group, and LBT not based on backoff (e.g., Cat-1 LBT or Cat-2 LBT) may be performed on the remaining beams in the beam group immediately before transmission. Then, if it is confirmed that the LBT is successful because the channel is idle, a signal may be transmitted.

The representative beam of the beam group may be a single beam or a plurality of beams. The representative beam may be semi-statically configured through higher layer signaling such as RRC or dynamically indicated through physical layer signaling such as DCI. If the representative beam of the beam group is not configured/indicated, a beam with the lowest index (e.g., beam #1 in FIG. 23(a)), a beam with the highest index (e.g., beam #5 in FIG. 23(a)), or a beam with the center index (e.g., beam #3 of FIG. 23(a)) within the beam group may be used as the default representative beam.

The BS may apply Embodiment #2-1 or Embodiment #2-2 to all DL transmissions or a specific DL signal/channel. In addition, the BS may dynamically instruct the UE to apply Embodiment #2-1 or Embodiment #2-2 to all UL transmissions or a specific UL signal/channel through physical layer signaling such as a UL grant. Alternatively, the BS may semi-statically configure to apply Embodiment #2-1 or Embodiment #2-2 through higher layer signals such as RRC.

For example, for DL, when the BS transmits a PDSCH, the BS may always perform LBT according to Embodiment #2-1 or Embodiment #2-2. When the BS transmits a broadcast signal such as an SSB, the BS may perform DL transmission by performing only LBT per beam group. For UL, the BS may instruct the UE to use Embodiment #2-1 or Embodiment #2-2 as LBT to be applied when the UE transmits a PUSCH through a UL grant scheduling the PUSCH. Alternatively, the BS may instruct the UE to perform only LBT in a specific beam direction. Further, the BS may instruct the UE to apply LBT in Embodiment #2-1 or Embodiment #2-2 to all UL transmissions through higher layer signaling such as RRC.

For UL transmission such as a DG-PUSCH or CG-PUSCH, the CAP of Embodiment #2-3 and Embodiment #2-4 may be applied. For the DG-PUSCH, the BS may dynamically indicate as LBT to be performed before UL transmission either LBT in a specific beam direction or LBT per beam group to the UE through a specific field of a UL grant.

For the CG-PUSCH, when configuring resources such as time/frequency through higher layer signaling such as RRC, the BS may configure as LBT to be performed before CG-PUSCH transmission either LBT in a specific beam direction or LBT per beam group together. Alternatively, after configuring the time/frequency resources through RRC, the BS may dynamically indicate either the LBT in the specific beam direction LBT or LBT per beam group as the LBT to be applied before the CG-PUSCH transmission in activation DCI. In this case, the former method may be applied to a Type 1 CG-PUSCH, and the latter method may be applied to a Type 2 CG-PUSCH.

According to Embodiment #2-5, considering the complexity of an operation for the BS to adjust an RX beam for PUSCH reception, LBT beam directions to be applied by the UE and/or TX beams depending on the LBT beam directions may be preconfigured for each time division multiplexed (TDMed) CG PUSCH resource.

The relationship between each CG resource and multiple beams may be preconfigured to the UE such that transmission on the multiple beams may be allowed for each CG resource. When the UE transmits a CG-PUSCH after successfully performing LBT in a specific beam direction, the UE may transmit information on the beam direction in which the LBT is successful to the BS in CG-UCI.

[Proposed Method #3]

Hereinafter, a method of increasing channel access opportunities when LBT (e.g., Cat-3 LBT or Cat-4 LBT based on a random backoff counter) is performed for each specific beam and a signal is transmitted will be described.

If LBT in a specific beam direction fails, LBT may be reattempted in a second beam direction or third beam direction within a beam group including the corresponding beam. If the LBT is successful, the opportunity of channel access may increase by transmitting a signal in the beam direction where the LBT is successful (e.g., second beam direction or third beam direction). The specific beam direction, the second beam direction, and the third beam direction may be predetermined. As another example, the specific beam direction may be related to the best beam having the best received signal strength indicator (RSSI) and/or reference signal received power (RSRP) within a corresponding beam group with respect to a specific reception beam of a receiver. The second beam direction and the third beam direction may be related to the second best beam and the third best beam. Alternatively, the second beam direction and the third beam direction may be related to beams spatially adjacent to the beam in the specific direction within the beam group.

When a beam group consists of a single beam, if LBT for the beam fails, LBT may be reattempted by falling back to O-LBT (or LBT per beam group) according to predetermined configurations or rules. Then, a signal may be transmitted when the corresponding LBT is successful. Alternatively, LBT may be attempted one more time in the corresponding beam direction where the LBT fails in order to increase the opportunity of channel access.

A beam group including each beam may be preconfigured through higher layer signaling and/or physical layer signaling. Referring to FIG. 23(a), the beam group may include a single beam or a plurality of beams. As shown in FIG. 23(b) when beams in all directions, that is, omnidirectional beams, which are a set of beams covering a specific sector in a cell, are included in one beam group, it may mean O-LBT.

The relationship between the second and third beams in the beam group may be predetermined/preconfigured by the BS. If the relationship is not predetermined/preconfigured, the UE may select any beams in the beam group as the second and third beams. In addition, [Proposed Method #3] may be applied only to delay-sensitive scenarios or high-priority transmissions.

Hereinafter, details of [Proposed Method #3] will be described.

In unlicensed bands, LBT needs to be always performed before transmission in order to check whether the channel is idle, and as a result, the possibility of delay or transmission failure may increase, compared to licensed bands. Thus, basically, LBT based on a random backoff counter (e.g., Cat-3 LBT or Cat-4 LBT) may be performed in a specific beam direction. Then, a signal may be transmitted only when the LBT is successful.

However, for delay-sensitive data such as URLLC traffic, transmission delay may increase due to LBT failure. Therefore, the following method may be applied to increase the opportunity of channel access. If LBT in a specific beam direction fails, LBT may be reattempted in a second beam direction or third beam direction within a beam group including the corresponding beam. If the reattempted LBT is successful, the opportunity of channel access may increase by transmitting a signal in the beam direction where the reattempted LBT is successful.

When a beam group consists of a single beam, LBT may be reattempted by falling back to O-LBT (or LBT per beam group) according to predetermined configurations or rules. Then, a signal may be transmitted when the reattempted LBT is successful. Alternatively, LBT may be attempted one more time in the corresponding beam direction where the LBT fails in order to increase the opportunity of channel access. The relationship between the second and third beams in the beam group may be predetermined/preconfigured by the BS. If the relationship is not predetermined/preconfigured, the UE may select any beams in the beam group. In addition, [Proposed Method #3] may be applied only to delay-sensitive scenarios or high-priority transmissions.

It is obvious that each of the examples of the proposed methods may also be included as one implementation method of the present disclosure, and thus each example may be regarded as a kind of proposed method. Although the above-described proposed methods may be implemented independently, some of the proposed methods may be combined (or merged) and implemented. For example, the embodiments in [Proposed Method #1] to [Proposed Method #3] may be implemented independently, but two or more embodiments may be implemented in combination.

In addition, it may be regulated that information on whether the proposed methods are applied (or information on rules related to the proposed methods) is transmitted from the BS to the UE or from the transmitting UE to the receiving UE in a predefined signal (e.g., physical layer signaling or higher layer signaling).

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 24:
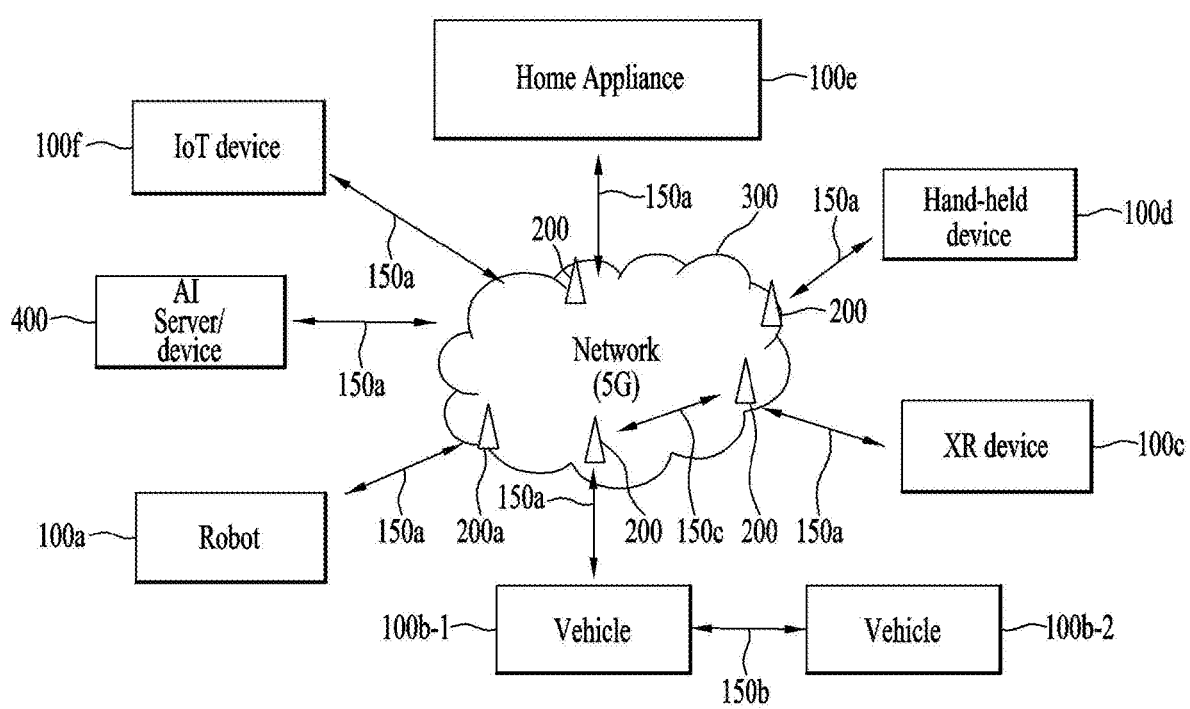
FIG. 24 illustrates an exemplary communication system applied to the present disclosure.

FIG. 24 illustrates a communication system 1 applied to the present disclosure.

Referring to FIG. 24, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 25:
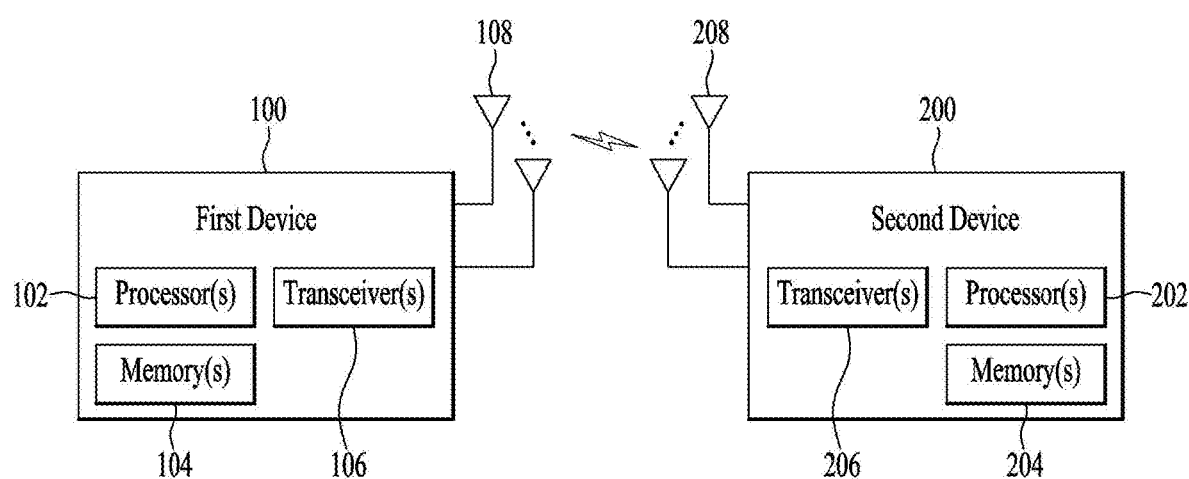
FIG. 25 illustrates an exemplary wireless device applicable to the present disclosure.
Figure 26:
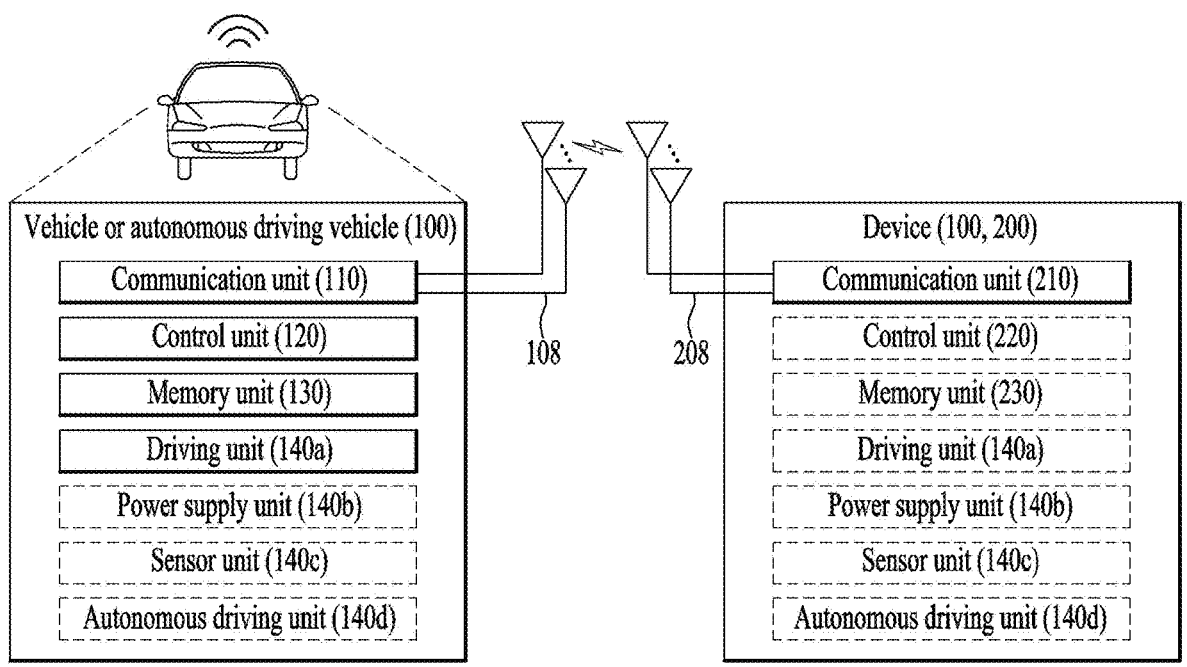
FIG. 26 illustrates an exemplary vehicle or autonomous driving vehicle applicable to the present disclosure.

FIG. 25 illustrates wireless devices applicable to the present disclosure.

Referring to FIG. 25, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor(s) 102 of the first wireless device 100 and stored in the memory(s) 104 of the first wireless device 100, according to an embodiment of the present disclosure will be described.

Although the following operations will be described based on a control operation of the processor(s) 102 in terms of the processor(s) 102, software code for performing such an operation may be stored in the memory(s) 104. For example, in the present disclosure, the at least one memory(s) 104 may be a computer-readable storage medium and store instructions or programs. The instructions or programs may cause, when executed, the at least one processor operably connected to the at least one memory to perform operations according to embodiments or implementations of the present disclosure, related to the following operations.

Specifically, the processor(s) 102 may perform at least one of beam LBT and beam group LBT according to [Proposed Method #2]. In this case, the CWSs and backoff counters of the beam LBT and beam group LBT may be configured according to [Proposed Method #1].

When the processor(s) 102 successfully perform the at least one of the beam LBT and beam group LBT, the processor(s) 102 may control the transceiver(s) 106 to transmit a UL signal. If the at least one LBT fails, the processor(s) 102 may perform the at least one of the beam LBT and beam group LBT again according to [Proposed Method #2] and/or [Proposed Method #3]. Depending on the success or failure, the processor(s) 102 may control the transceiver(s) 106 to transmit the UL signal.

In addition, the processor (s) 102 may control the transceiver (s) 106 to receive information on the type of LBT that the processor (s) 102 needs to perform or is capable of performing among the beam LBT and beam group LBT. The processor(s) 102 may perform the at least one of the beam LBT and beam group LBT based on the received information according to [Proposed Method #1] to [Proposed Method #3]. The processor(s) 102 may control the transceiver (s) 106 to transmit the UL signal according to the result of the at least one LBT.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor(s) 202 of the second wireless device 100 and stored in the memory(s) 204 of the second wireless device 200, according to an embodiment of the present disclosure will be described.

Although the following operations will be described based on a control operation of the processor(s) 202 in terms of the processor(s) 202, software code for performing such an operation may be stored in the memory(s) 204. For example, in the present disclosure, the at least one memory(s) 204 may be a computer-readable storage medium and store instructions or programs. The instructions or programs may cause, when executed, the at least one processor operably connected to the at least one memory to perform operations according to embodiments or implementations of the present disclosure, related to the following operations.

Specifically, the processor(s) 202 may perform at least one of beam LBT and beam group LBT according to [Proposed Method #2]. In this case, the CWSs and backoff counters of the beam LBT and beam group LBT may be configured according to [Proposed Method #1].

When the processor(s) 202 successfully perform the at least one of the beam LBT and beam group LBT, the processor(s) 202 may control the transceiver(s) 206 to transmit a DL signal. If the at least one LBT fails, the processor(s) 202 may perform the at least one of the beam LBT and beam group LBT again according to [Proposed Method #2] and/or [Proposed Method #3]. Depending on the success or failure, the processor(s) 202 may control the transceiver(s) 206 to transmit the DL signal.

In addition, the processor (s) 202 may control the transceiver (s) 206 to receive information on the type of LBT that the processor (s) 202 needs to perform or is capable of performing among the beam LBT and beam group LBT. The processor(s) 202 may perform the at least one of the beam LBT and beam group LBT based on the received information according to [Proposed Method #1] to [Proposed Method #3]. The processor(s) 202 may control the transceiver (s) 206 to transmit the UL signal according to the result of the at least one LBT.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The method of performing a channel access procedure (CAP) and apparatus therefor have been described based on the 5th generation (5G) new radio access technology (RAT) system, but the method and apparatus are applicable to various wireless communication systems including the 5G new RAT system.

What is claimed is:

1. A method performed by a user equipment (UE), the method comprising:
    performing, by the UE, first channel sensing for a specific beam of a group of beams;
    determining whether a result of the first channel sensing is idle, based on a first energy detection (ED) threshold;
    based on the result of the first channel sensing being idle, performing, by the UE, second channel sensing for remaining beams of the group of beams;
    determining whether a result of the second channel sensing is idle, based on a second ED threshold; and
    based on the result of the second channel sensing being idle, transmitting an uplink signal through the group of beams,
    wherein the specific beam is a single representative beam covering the group of beams.

2. The method of claim 1, wherein at least one of a first contention window size (CWS) or a first backoff counter value for the first channel sensing depends on at least one of a second CWS and a second backoff counter value for the second channel sensing.

3. The method of claim 1, wherein a first contention window size (CWS) and a first backoff counter value for the first channel sensing and a second CWS and a second backoff counter value for the second channel sensing are obtained independently.

4. The method of claim 1, wherein each of the first channel sensing and the second channel sensing is channel sensing based on a backoff counter.

5. A user equipment (UE) comprising:
    at least one transceiver;
    at least one processor; and
    at least one memory operably connected to the at least one processor and configured to store instructions that, when executed, cause the at least one processor to perform operations comprising:
    performing, by the UE, first channel sensing for a specific beam of a group of beams;
    determining whether a result of the first channel sensing is idle, based on a first energy detection (ED) threshold;
    based on the result of the first channel sensing being idle, performing, by the UE, second channel sensing for remaining beams of the group of beams;
    determining whether a result of the second channel sensing is idle, based on a second ED threshold; and
    based on the result of the second channel sensing being idle, transmitting an uplink signal through the group of beams,
    wherein the specific beam is a single representative beam covering the group of beams.

6. The UE of claim 5, wherein at least one of a first contention window size (CWS) or a first backoff counter value for the first channel sensing depends on at least one of a second CWS and a second backoff counter value for the second channel sensing.

7. The UE of claim 5, wherein a first contention window size (CWS) and a first backoff counter value for the first channel sensing and a second CWS and a second backoff counter value for the second channel sensing are obtained independently.

8. The UE of claim 5, wherein each of the first channel sensing and the second channel sensing is channel sensing based on a backoff counter.

9. A non-transitory medium storing instructions that, when executed by a processor of a user equipment (UE), causes the UE to perform operations, the operations comprising:
    performing, by the UE, first channel sensing for a specific beam of a group of beams;
    determining whether a result of the first channel sensing is idle, based on a first energy detection (ED) threshold;

based on the result of the first channel sensing being idle, performing, by the UE, second channel sensing for remaining beams of the group of beams;

determining whether a result of the second channel sensing is idle, based on a second ED threshold; and based on the result of the second channel sensing being idle, transmitting an uplink signal through the group of beams, wherein the specific beam is a single representative beam covering the group of beams.

10. The method of claim 1, wherein the first ED threshold is smaller than or equal to the second ED threshold.

* * * * *